US009891796B2

(12) United States Patent
DiMaria et al.

(10) Patent No.: US 9,891,796 B2
(45) Date of Patent: *Feb. 13, 2018

(54) USER INTERFACE TO MEDIA FILES

(71) Applicant: Gracenote, Inc., Emeryville, CA (US)

(72) Inventors: Peter C. DiMaria, Berkeley, CA (US); Ching-Wei Chen, Oakland, CA (US); Vadim Brenner, San Francisco, CA (US)

(73) Assignee: Gracenote, Inc., Emeryville, CA (US)

( * ) Notice: Subject to any disclaimer, the term of this patent is extended or adjusted under 35 U.S.C. 154(b) by 196 days.

This patent is subject to a terminal disclaimer.

(21) Appl. No.: 14/462,402

(22) Filed: Aug. 18, 2014

(65) Prior Publication Data

US 2015/0052436 A1 Feb. 19, 2015

Related U.S. Application Data

(63) Continuation of application No. 13/345,615, filed on Jan. 6, 2012, now Pat. No. 8,855,798.

(51) Int. Cl.
*G06F 17/00* (2006.01)
*G06F 3/0484* (2013.01)
(Continued)

(52) U.S. Cl.
CPC ........ *G06F 3/04842* (2013.01); *G06F 3/0482* (2013.01); *G06F 17/30038* (2013.01);
(Continued)

(58) Field of Classification Search
CPC .................. G10H 2240/085; G10H 2220/131
See application file for complete search history.

(56) References Cited

U.S. PATENT DOCUMENTS 5,676,138 A 10/1997 Zawilinski
6,212,502 B1 4/2001 Ball et al.
(Continued)

FOREIGN PATENT DOCUMENTS

WO 2005113099 12/2005
WO 2016109553 7/2016

OTHER PUBLICATIONS

"U.S. Appl. No. 13/345,615, Examiner Interview Summary mailed Apr. 10, 2014", 3 pgs.
(Continued)

*Primary Examiner* — Thomas Maung
(74) *Attorney, Agent, or Firm* — Hanley, Flight & Zimmerman, LLC

(57) ABSTRACT

A user interface generator is configured to access a media file that stores acoustic data representative of sounds. The user interface generator determines a mood category of the media file, based on a mood vector calculated from the acoustic data. The mood category characterizes the media file as being evocative of a mood described by the mood category. The user interface generator generates a user interface that depicts a grid or map (e.g., a "mood grid" or a "mood map") of multiple zones. One of the zones may occupy a position in the grid or map that corresponds to the mood category. The user interface may then be presented by the user interface generator (e.g., to a user). In the presented user interface, the zone that corresponds to the mood category may be operable (e.g., by the user) to perform one or more actions pertinent to the mood category.

26 Claims, 12 Drawing Sheets

(51) Int. Cl.
*G06F 17/30* (2006.01)
*G06F 3/0482* (2013.01)

(52) U.S. Cl.
CPC . *G06F 17/30058* (2013.01); *G10H 2220/131* (2013.01); *G10H 2240/085* (2013.01)

(56) References Cited

U.S. PATENT DOCUMENTS

| | | |
|---|---|---|
| 6,980,149 B1 | 12/2005 | Meyer |
| 7,194,539 B2 | 3/2007 | Hughes et al. |
| 7,243,104 B2 | 7/2007 | Bill |
| 7,698,238 B2 | 4/2010 | Barletta et al. |
| 7,921,067 B2 | 4/2011 | Kemp et al. |
| 8,260,778 B2 | 9/2012 | Ghatak |
| 8,373,768 B2 | 2/2013 | Bill |
| 8,855,798 B2 | 10/2014 | DiMaria et al. |
| 9,009,027 B2 | 4/2015 | Lehman et al. |
| 9,639,536 B2 | 5/2017 | Jellison, Jr. |
| 9,678,961 B2 | 6/2017 | Adams et al. |
| 2002/0130898 A1 | 9/2002 | Ogawa et al. |
| 2003/0063222 A1 | 4/2003 | Creed et al. |
| 2004/0003706 A1 | 1/2004 | Tagawa et al. |
| 2004/0267736 A1* | 12/2004 | Yamane ............ G06F 17/30017 |
| 2006/0212478 A1 | 9/2006 | Plastina et al. |
| 2006/0236847 A1 | 10/2006 | Withop |
| 2007/0182741 A1* | 8/2007 | Chosokabe ......... G06F 3/04817 345/440 |
| 2008/0005688 A1* | 1/2008 | Najdenovski ..... G06F 17/30053 715/765 |
| 2008/0066611 A1* | 3/2008 | Makino ................ G10H 1/0008 84/609 |
| 2008/0109391 A1 | 5/2008 | Chan |
| 2009/0002178 A1 | 1/2009 | Guday et al. |
| 2009/0234888 A1 | 9/2009 | Holmes et al. |
| 2009/0281906 A1 | 11/2009 | Cai et al. |
| 2010/0011388 A1 | 1/2010 | Bull et al. |
| 2010/0053168 A1 | 3/2010 | Kemp et al. |
| 2010/0325107 A1 | 12/2010 | Kenton et al. |
| 2011/0252947 A1* | 10/2011 | Eggink ............ G06F 17/30749 84/609 |
| 2012/0284753 A1 | 11/2012 | Roberts et al. |
| 2013/0178962 A1 | 7/2013 | Dimaria et al. |
| 2014/0330848 A1 | 11/2014 | Chen et al. |

OTHER PUBLICATIONS

"U.S. Appl. No. 13/345,615, Non Final Office Action mailed Jan. 28, 2014", 27 pgs.

"U.S. Appl. No. 13/345,615, Notice of Allowance mailed Jun. 6, 2014", 13 pgs.

"U.S. Appl. No. 13/345,615, Response filed Apr. 25, 2014 to Non Final Office Action mailed", 20 pgs.

U.S. Appl. No. 61/865,052, dated Dec. 8, 2013, Pradeep.

Michael Nuzzolo, "Music Mood Classification_Electrical and Computer Engineering Design Handbook" (2015), <https://sites.tufts.edu/eeseniordesignhandbook/2015/musicmoodclassification/> (6 pages).

Pablo Stanley, "Designing Musical User Interfaces—The Startup—Medium" (Jul. 13, 2015), <https://medium.com/swlh/designing-musical-user-interfaces-4f30b41d7a83> (10 pages).

Lulian Radu, "Affecting Affect—Mood Control Interface," <www.cc.gatech.edu/~iulian/portfolio_resources/cogs401_researchp.doc> (5 pages).

Fernandes, J. "Automatic Playlist Generation via Music Mood Analysis" (2010), MSc Thesis, <http://mir.dei.uc.pt/pdf/Theses/MOODetector/Fernandes%20MSc%20Thesis%202010.pdf> (87 pages).

The Local, "New mobile tech makes music to suit moods", (Nov. 14, 2014). <https://www.thelocal.no/20141114/new-mobile-tech-makes-music-to-suit-moods> (2 pages).

Owen Craigie Meyers, "A Mood-Based Music Classification and Exploration System", (Jun. 2007), School of Architecture and Planning, Massachusetts Institute of Technology, (93 pages).

Barthet et al., "Moodplay: An Interactive Mood-Based Musical Experience", (2015), Queen mary, university of London, (9 pages).

* cited by examiner

USER INTERFACE TO MEDIA FILES

RELATED APPLICATIONS

This application is a Continuation of U.S. patent application Ser. No. 13/345,615, filed Jan. 6, 2012, the entire contents of which are incorporated herein by reference.

TECHNICAL FIELD

The subject matter disclosed herein generally relates to the processing of data. Specifically, the present disclosure addresses systems and methods of providing a user interface to media files.

BACKGROUND

A media system may be used to present (e.g., play) all or part of one or more media files. As used herein, a "media file" is a body of data that stores information usable to present content of the media file. For example, the media file may store acoustic data that represents one or more sounds (e.g., music, speech, noise, or sound effects), visual data that represents one or more patterns of light (e.g., video, animation, or images), text data that represents one or more alphanumeric characters (e.g., words or phrases), or any suitable combination thereof.

Multiple media files may be stored (e.g., as a collection or a library of media files), and the media system may access one or more of the multiple media files for presentation. An example of a collection of media files is a folder (e.g., a directory within a file system) of audio files storing songs or partial songs performed by a recording artist. Another example of a collection of media files is a database (e.g., a data repository) of movie files storing movies purchased by a user (e.g., a consumer). A further example of a collection of media files is a storage device (e.g., a disk drive) that stores an assortment of music files (e.g., songs), electronic books (e.g., presentable by a reading device), video files (e.g., downloaded from the Internet), or any suitable combination thereof.

BRIEF DESCRIPTION OF THE DRAWINGS

Some embodiments are illustrated by way of example and not limitation in the figures of the accompanying drawings.

DETAILED DESCRIPTION

Figure 1:
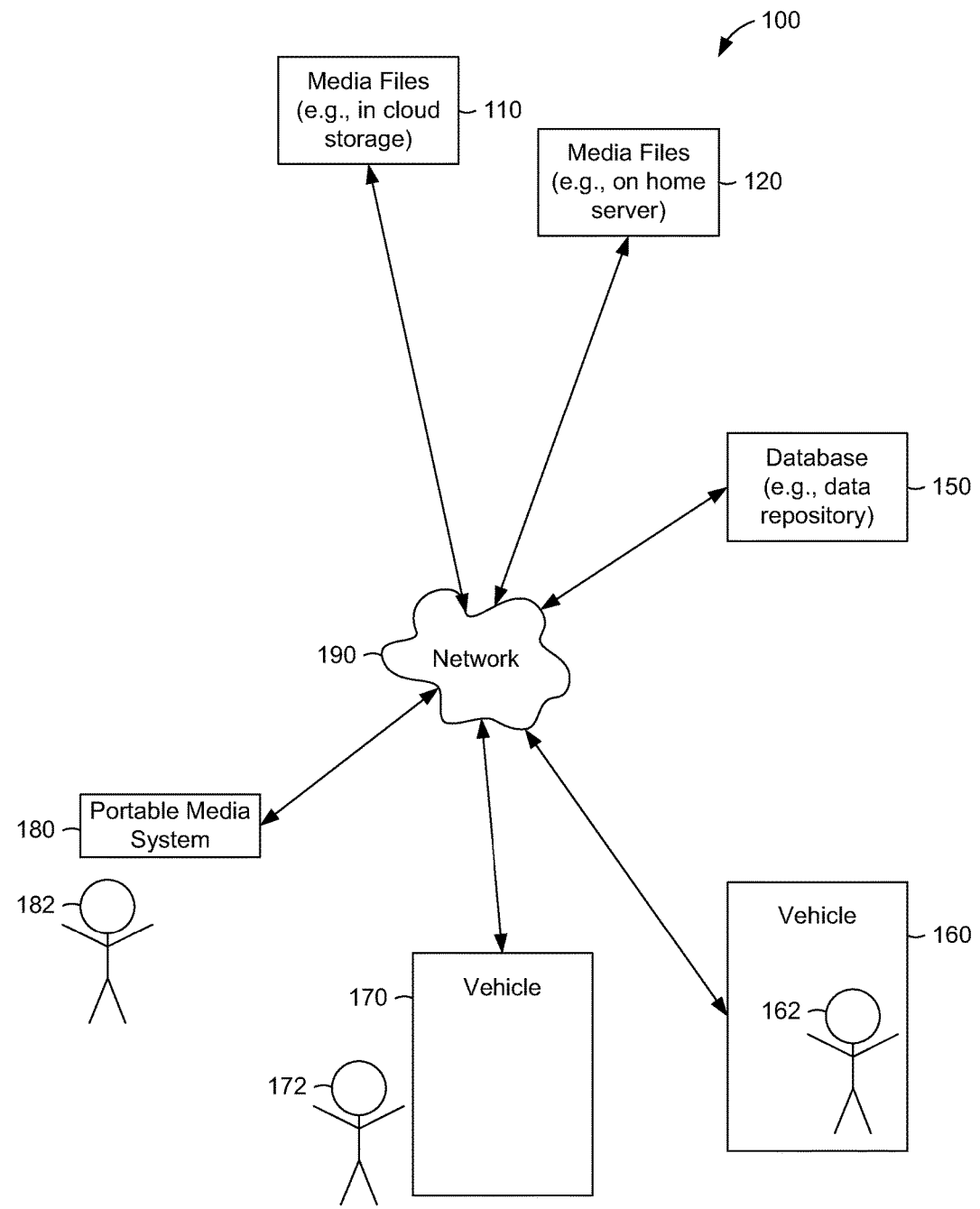
FIG. 1 is a network diagram illustrating a network environment suitable for providing a user interface to media files, according to some example embodiments.

Example methods and systems are directed to the user interface to media files (e.g., a user interface to access, view, manage, preview, or play media files). Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A user interface generator may form all or part of a media system (e.g., a portable media system, a vehicle media system, or a server-based media system accessed via a client) that is implemented, in whole or in part, by a machine (e.g., a device or computer system). Among other functions, the user interface generator is configured to access a media file that stores acoustic data representative of sounds. The user interface generator determines a mood category (e.g., a primary mood category) of the media file, based on a mood vector calculated from the acoustic data. The mood category characterizes the media file as being evocative of a mood described by the mood category. The user interface generator generates a user interface (e.g., a 2D or 3D user interface) that depicts a grid (e.g., a "mood grid" or a "mood map") with a zone whose position in the grid corresponds to the mood category. This user interface may then be presented by the user interface generator (e.g., to a user). In the presented user interface, the zone that corresponds to the mood category may be operable (e.g., by the user) to perform one or more actions pertinent to the mood category. Although the discussion herein, for purposes of clarity, discusses the mood category as characterizing the media file and as corresponding to the position of the zone in the grid, various example embodiments may replace or combine the mood category with any attribute that is suitable for categorizing the media file (e.g., genre, origin, tempo, instrumentation, rhythm, melody, lyric theme, artist, album, release year, playback duration, file size, acquisition year, rating, or playback frequency).

For example, the user interface may be displayed on a touch-sensitive screen of a display in which the zone is a touch-sensitive area of the screen that is operable to initiate the one or more actions pertinent to the mood category (e.g., displaying content items, such as tracks, albums, or artists, that are members of the mood category, generating a playlist for the mood category, displaying the playlist, editing the playlist, modifying a definition of the playlist, playing the playlist, generating a recommendation, modifying a definition or preference for generating recommendations, updating a list of preferences or favorites of a user, or presenting other users related to the mood category). In other words, the zone may be operable to select the mood category for performance of the one or more actions. As used herein, "selection" of a mood category refers to identifying the mood category among other mood categories represented in the user interface (e.g., designating the mood category's zone for action or information). In some example embodiments, the zone may be operated using a touch command, a gesture command, a voice command, or any suitable combination thereof. According to various example embodiments, a user may select the mood category by providing such a command in the form of directional input, where the directional guidance may be based on a physical layout of the grid (e.g., "up," "down," "right," "left," up and right," or "down and left"). In certain example embodiments, the user may provide such a command in the form of input relative to an axis of the grid (e.g., "more energetic," "less energetic," "more positive," or "less positive") or relative to multiple axes of the grid (e.g., "more somber" being equivalent to "more calm and dark," "more peaceful" being equivalent to "more calm and positive," "more aggressive" being equivalent to "more energetic and dark"). Moreover, verbal or textual input may be translated to allow synonyms or colloquialisms that correspond to a particular mood category (e.g., "raging" being translatable to "aggressive") or to input relative to an access of the grid (e.g., "more mellow" being translatable to "more calm"). The user interface generator may receive a user's selection of the zone and initiate the one or more actions with respect to the mood category.

In some example embodiments, the user interface includes one or more navigational legends or labels. A navigational legend may identify an attribute that is represented (e.g., mapped) along an axis of the grid (e.g., "Energy" or "Valence"). The user interface may include one or more boundary values for an axis (e.g., "Positive" and "Dark" for valence levels, "Calm" and "Energetic" for energy levels). A boundary value may indicate an extreme (e.g., a minimum or maximum) value for a combination of multiple axes (e.g., "Somber" indicating maximum calmness and maximum darkness, "Peaceful" indicating maximum calmness and maximum positivity, "Aggressive" indicating maximum energy and maximum darkness, or "Excited" indicating maximum energy and maximum positivity). Furthermore, one or more navigational legends or labels of the user interface may be modified (e.g., by a user, an application, or a developer) to reflect localization, alternate cultural viewpoints, personal preferences, or any suitable combination thereof. In some example embodiments, one or more navigational legends or labels may be replaced with an activity-based label or theme-based label that corresponds to (e.g., as appropriate for) a mood category represented in the user interface.

According to various example embodiments, an action initiated by the selection of the zone may be directed at the mood category corresponding to the zone, at one or more mood categories corresponding to adjacent or nearby zones (e.g., adjacent or nearby to the zone whose position in the grid corresponds the mood category), or any suitable combination thereof. That is, a user may select (e.g., explicitly or implicitly) more than one zone within the grid at a time. For example, selection of one zone may be treated as selection of a primary zone, and one or more adjacent or nearby zones may be treated as being selected as secondary zones. In some example embodiments, the selection of an adjacent or nearby zone is weighted or determined based on a weighting factor that represents a degree of influence or an extent of similarity between the selected zone (e.g., primary zone) and the adjacent zone (e.g., secondary zone). In some example embodiments, one or more additional (e.g., secondary) zones may be selected based on similarity data (e.g., accessed from a table of correlations among zones or mood categories). The multiple zones are explicitly or implicitly selected, the multiple zones may be contiguous or noncontiguous. Furthermore, in some example embodiments, selection of a zone identifies the corresponding mood category for exclusion from one or more actions (e.g., deselection of the zone, deselection of the mood category, or both).

In certain example embodiments, a user may select a sequence of zones (e.g., a sequence that defines a trajectory, arc, or path that spans multiple zones). The sequence may be contiguous or noncontiguous. The selected sequence may indicate that an action (e.g., playback of a playlist) is to be initiated for multiple mood categories corresponding to the selected zones in sequential order. In various example embodiments, the selection of a zone identifies the mood category for exclusion from one or more actions (e.g., deselection of the zone, the mood category, or both).

According to certain example embodiments, the user interface visually indicates information pertinent to the mood category (e.g., the mood evoked by the mood category, an attribute of the mood category, a degree or level of energy, a degree or level of valence, a number of media files categorized in the mood category, a number of new media files within a period of time, an explicit or implicit preference of a user for the mood category, other historical user behavior related to the mood category, or a preference of one or more other users for the mood category). Indication of such information may be performed based on the location (e.g., relative location) of the zone corresponding to the mood category within the user interface, the visual appearance or size of the zone, audio information played upon selection of the mood category, or any suitable combination thereof.

In some example embodiments, the user interface depicts the zone using one or more visual indicators (e.g., color, hue, saturation, brightness, texture, movement, a graphic image, a photographic image, or any suitable combination thereof) that correspond to the information visually indicated (e.g., as in a "heat map" of mood categories). A visual indicator may correspond to the location of the zone within the grid, to the location of the zone with respect to one or more axes of the grid, or any suitable combination thereof. For example, the location of the zone along a horizontal axis (e.g., x-axis) may determine the hue of the zone; the location of the zone along a vertical axis (e.g., y-axis) may determine the brightness of the zone; and the location of the zone along a depth axis (e.g., z-axis) may determine the saturation of the zone. As another example, the location of the zone along an axis (e.g., x-axis) may determine the texture granularity of the zone, and the location of the zone along another axis (e.g., y-axis) may determine the velocity of a motion graphic effect for the zone.

In certain example embodiments, a visual indicator of a zone may correspond to the zone itself. Moreover, the palette, tone, or degree of variation in the visual indicators may be dynamically adapted based on attributes of the media files (e.g., a unique mix of media content) accessible by the user interface generator (e.g., by a media system that includes the user interface generator), user behavior, user preferences, other personalized information, or any suitable combination thereof. Furthermore, the palette, tone, or degree of variation among the visual indicators may be dynamically adapted based on prior selections of attributes or filters that have the effect of narrowing or expanding a set of media files (e.g., a subset or playlist of the multiple media files) presented to a user. For example, an initial presentation of the user interface (e.g., with the grid) may utilize simple and pure colors. However, once a focusing attribute has been selected (e.g., genre), the appearance of the visual indicators in the user interface may be altered to visually conform to and communicate a unique meaning of each mood category (e.g., in combination with the selected genre). Further selection of additional narrowing criteria (e.g., era) may further refine the appearance of the visual indicators. This may have the effect of precisely representing the meaning of each mood category, in combination with previously selected criteria (e.g., genre and era).

Moreover, according to various example embodiments, the user interface may depict one or more sub-categories of the mood category (e.g., as a further grid of sub-categories) in response to selection of the zone that corresponds to the mood category. For example, the zone may correspond to a broad mood category (e.g., "Cool"), and an action initiated by selection of the zone may be a presentation of a further grid of one or more specific mood sub-categories (e.g., "Casual Groove," "Cool Confidence," Wary/Defiant," and "Dark Groovy") that correspond to the broad mood category (e.g., with parent-child relationships).

In certain example embodiments, multiple levels or layers of sub-categories may be represented in the user interface. For example, the user interface may depict a hierarchy of mood categories and mood sub-categories (e.g., a top level of 25 zones, a middle level of 100 zones, and a lower level of 400 zones). Each level may be arranged based on a same set of axes representing a same set of attributes, so that the relative location of a zone at any level may have its attribute values consistently represented with respect to the axes of the user interface. In some example embodiments, the number of mood sub-categories under each mood category is normalized such that the number of mood sub-categories is identical for each mood category (e.g., each mood category having exactly four mood sub-categories). Also, the depiction of the mood sub-categories may be normalized such that each mood sub-category's zone hasn't identical size and shape. Furthermore, the user interface may depict the mood sub-categories of a parent mood category as completely filling and fitting into the boundaries of the parent mood category's zone. Navigation or traversal of a hierarchy of mood categories and mood sub-categories may be presented in the user interface by completely overlaying a higher level grid with only those mood sub-categories that are selected. In some example embodiments, navigation or traversal may be presented by overlaying only the zone of the selected parent mood category with the selected mood sub-categories. In certain example embodiments, the user interface provides a magnified (e.g., "pop out") window or widget in which the selected mood sub-categories are sized to expand past the boundaries of the parent mood category's zone.

In various example embodiments, a hierarchy of mood categories and mood sub-categories may be assembled by combining different mood categories, differ media files, or any suitable combination thereof. For example, a hierarchy may include a top level for mood, a middle level for genre, at a lower level for era. As another example, a hierarchy may include a top-level for mood, a middle level for artists, and a lower-level for media files (e.g., songs or recordings). One or more axes depicted in the user interface may vary depending on level within the hierarchy. For example, all levels may have axes for energy (e.g., arousal) and valence. As another example, the top-level may have axes for energy and valence, while the middle level and a lower-level may have axes for global popularity and user personal preference.

Within the user interface, levels within the hierarchy of mood categories and mood sub-categories may be presented as a sequence of filters (e.g., to a user in defining a desired set of media files). In some example embodiments, the middle level of the hierarchy may depict only those mood sub-categories that are relevant in view of the user's selection (e.g., of a mood category) from the top-level of the hierarchy. For example, if the top-level selection was a mood category for "Peaceful," a middle level presentation of genres may display only those genres (e.g., zones corresponding to genres) that contain a substantial number of media files evocative of the mood "peaceful." That is, the zones for other genres (e.g., "Punk") may be blank, grayed out, otherwise deemphasized or omitted from the middle level of the hierarchy within user interface.

According to some example embodiments, an action initiated by selection of the zone may be a presentation of a representative media file that is characterized as being evocative of the mood described by the mood category. For example, selection of the zone (e.g., by touch, mouse over, or mouse click) may initiate playback of a "navigational" audio file storing content that expresses the mood of the mood category (e.g., "Peaceful"). Multiple representative media files may be presented in this matter. In some example embodiments, for navigational purposes, the presented media files may be short segments or clips of a complete song or recording. This may have the effect of enabling a user (e.g., a driver of a vehicle) to understand the mood without reading the mood category (e.g., from a label presented in the user interface). The "navigational" audio file may be a member of the user's collection of media files, a media file selected from a broader set of media files, or a media file synthesized or generated for navigational purposes. Transitions from one mood category to another may be presented with cross-fading or other transitional audiovisual treatments.

In some example embodiments, the user interface may be generated (e.g., by the user interface generator) based on one or more axes that are selected (e.g., by a user) for display in the grid. For example, the grid may include an axis (e.g., a selected axis) that represents a range of levels descriptive of musical energy (e.g., arousal), for example, from calm to energetic. As another example, the grid may include an axis that represents a range of valence (e.g., positivity) levels descriptive of musical positivity or musical darkness, for example, from dark to positive. Other example axes may represent a group of genres (e.g., genres of music or movies), a range of eras (e.g., musical or artistic time periods), origins (e.g., national or regional origins) of content in media files, a set of lyrical themes, a group of instrumentation categories, a group of rhythm types, a range of musical tempos, or any suitable combination thereof. The values of the axes may be arranged according to a scale or arranged as an ordered list.

According to various example embodiments, the zones of the grid correspond to unique mood categories or high-level attributes of mood categories (e.g., mood). The zones and their corresponding categories may be located within the grid based on values of other descriptive attributes associated with (e.g., corresponding to) the mood category (e.g., energy and valence). Within a mood category, content (e.g., media files) may be classified directly into the mood category. That is, in some example embodiments, there is no direct classification of content to any descriptive attributes of the mood category. Moreover, assignment of the mood category to its location (e.g., specific coordinates) within the grid may be performed separately.

In some example embodiments, one or more axes of the grid is normalized such that the normalized axis consistently depicts or represents a specific number of zones or mood categories. For example, the number of zones may be constrained to be identical for multiple axes in the grid (e.g., a 5×5 grid in two dimensions, or a 10×10×10 grid in three dimensions). The size of each zone may accordingly be normalized (e.g., as a 2D area or a 3D volume) so that all zones are equivalent in size. This may have the effect of enhancing the simplicity of the user interface and of the user experience provided by the user interface.

In certain example embodiments, the user interface may be generated (e.g., in part) based on contextual information available to the user interface generator. For example, the grid of the user interface may be generated as an arrangement of multiple zones, or a zone's presence or prominence in the grid is determined, wholly or partly, by the contextual information. As an example, the multiple zones may correspond to multiple playlists of a uniform size or multiple playlists of variable size. Examples of contextual information include weather data, speed data (e.g., of a vehicle), location data, time data (e.g., calendar data), personal presence, newsfeeds, social network feeds, a preference of a user (e.g., a personal preference for particular mood categories), drowsiness data (e.g., determined by capturing an image of a driver of a vehicle), alertness data (e.g., determined by capturing an image of a driver of a vehicle), and emotion data (e.g., determined by capturing an image of a driver of a vehicle). Additional examples of contextual information include explicit user preferences, music collection composition (e.g., determined by analysis of the media files), and historical user behavior.

According to various example embodiments, a default grid (e.g., a default mood grid) is presented to a user as a middle-level of a hierarchy of mood categories and mood sub-categories, where the middle level depicts 100 zones (e.g., corresponding to 100 mood categories). However, based on an analysis of the user's personal music collection, listening behavior, or both, it may be determined that the user has unusually strong interest in music that expresses a variety of aggressive moods, while the same user has unusually weak interest in music expressing peaceful moods. The user interface generator accordingly may adapt to the grid to conform more to the mood categories and the precision relevant to the user's interests. For this purpose, some of the more precise or granular aggressive mood categories from a lower level of the hierarchy (e.g., a lower level that depicts 400 mood categories) may be elevated into the middle level of the hierarchy. This may have the effect of enabling the user to directly browse and select from a richer set of aggressive mood categories. Furthermore, some of the less precise or granular peaceful categories from a top-level of the hierarchy (e.g., a top level that depicts 25 mood categories) may be brought down to supplant the more specific default middle level mood categories that they contain. Accordingly, the results may be a revised and personalized middle level of the hierarchy, where the middle level provides greater resolution in the aggressive portion of the grid and less resolution in the peaceful portion of the grid. Moreover, this may be performed while keeping the total number of mood categories displayed the same as the 100 mood categories in the default grid.

In some example embodiments, the personalized grid only brings down some of the less precise mood categories from the top level of the hierarchy, which may result in a reduced total number of zones in the personalized middle level of the hierarchy. In other example embodiments, the personalized top level grid is created by selecting a subset of the most relevant middle level mood categories equal in number to the top-level default mood categories (e.g., 25 mood categories). The mood categories may be arranged in the personalized top level of the hierarchy in a configuration that is similar to the original relative positions to each other in the middle level of the hierarchy. A similar approach may be utilized to construct a personalized top level hierarchy of the grid from 25 of the 400 lower level mood categories, which may result in an even more focused set of options for the user. Furthermore, a similar approach may be utilized to construct a personalized middle level of the hierarchy from 100 of 400 mood categories in the lower level of the hierarchy.

FIG. 1 is a network diagram illustrating a network environment 100 suitable for providing a user interface to media files, according to some example embodiments. The network environment 100 includes media files 110, media files 120, a database 150, vehicles 160 and 170, and a portable media system 180, all communicatively coupled to each other via a network 190. In some example embodiments, multiple networks (e.g., network 190 and another network) connect one or more of the media files 110 and 120, the database 150, the vehicles 160 and 170, and the portable media system 180.

The media files 110 and 120 each may be stored in a database (e.g., a data storage device or machine) accessible via the network 190. Such a database may be called a "media store database" or simply a "media store." For example, the media files 110 may be stored in a cloud-based data storage system (e.g., implemented across multiple machines networked together), and the media files 120 may be stored on a home media server (e.g., one or more disk drives of a personal computer for storing media content). Although the media files 110 and 120 are shown as being stored in the independent data repositories, according to various example embodiments, the media files 110 and 120 may be stored, wholly or partly, within the vehicle 160, the portable media system 180, or any suitable combination thereof. Some example embodiments maintain the media files 110 and 120 separately from the database 150.

The vehicles 160 and 170 each may be a transportation machine suitable for conveying one or more users (e.g., users 162 and 172) as drivers or passengers. Examples of such a transportation machine include a car, a bus, a truck, an airplane, a ship, a boat, a submarine, a motorcycle, a bicycle, a scooter, and any combination thereof. Each of the vehicles 160 and 170 may include a vehicle media system that may be implemented in a computer system, in whole or in part, as described below with respect to FIG. 12.

The portable media system 180 may be a device or machine configured or configurable for presentation of one or more media files. The media files may be stored, temporarily or permanently, by the portable media system 180. In some example embodiments, the media files are accessed via the network 190 from one or more databases (e.g., media files 110 or database 150). The portable media system 180 may be implemented in a computer system, in whole or in part, as described below with respect to FIG. 12. As further examples, the portable media system 180 may be implemented in a mobile phone, a computer, a tablet computing device, or any suitable combination thereof. Although the portable media system 180 is shown as being distinct from the vehicle 160, some example embodiments combine the portable media system 180 with the vehicle 160 (e.g., by communicatively coupling the portable media system 180 with an audio system of the vehicle 160).

Also shown in FIG. 1 are users 162, 172, and 182. Any one or more of the users 162, 172, and 182 may be a human user (e.g., a human being), a machine user (e.g., a computer configured by a software program to interact with a portable media system or a vehicle media system), or any suitable combination thereof (e.g., a human assisted by a machine or a machine supervised by a human). The user 162 is not part of the network environment 100, but is associated with the vehicle 160 and may be a driver of the vehicle 160. Similarly, the user 172 is not part of the network environment 100, but is associated with the vehicle 170 and may be a user of a vehicle media system implemented within the vehicle 170. Likewise, the user 182 is not part of the network environment 100, but is associated with the portable media system 180. The portable media system 180 may be implemented within a desktop computer, a vehicle computer, a tablet computer, a navigational device, a portable media device, or a smart phone belonging to the user 182.

Any of the systems, databases, or vehicles shown in FIG. 1 may implement or include a general-purpose computer modified (e.g., configured or programmed) by software to be a special-purpose computer to perform one or more of the functions described herein. For example, a computer system able to implement any one or more of the methodologies described herein is discussed below with respect to FIG. 12. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the systems, databases, or vehicles illustrated in FIG. 1 may be combined into a single machine, and the functions described herein for any single system, database, or vehicle may be subdivided among multiple machines.

The network 190 may be any network that enables communication between systems, databases, vehicles, or other machines (e.g., media files 110 and the vehicle 160). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof.

Figure 2:
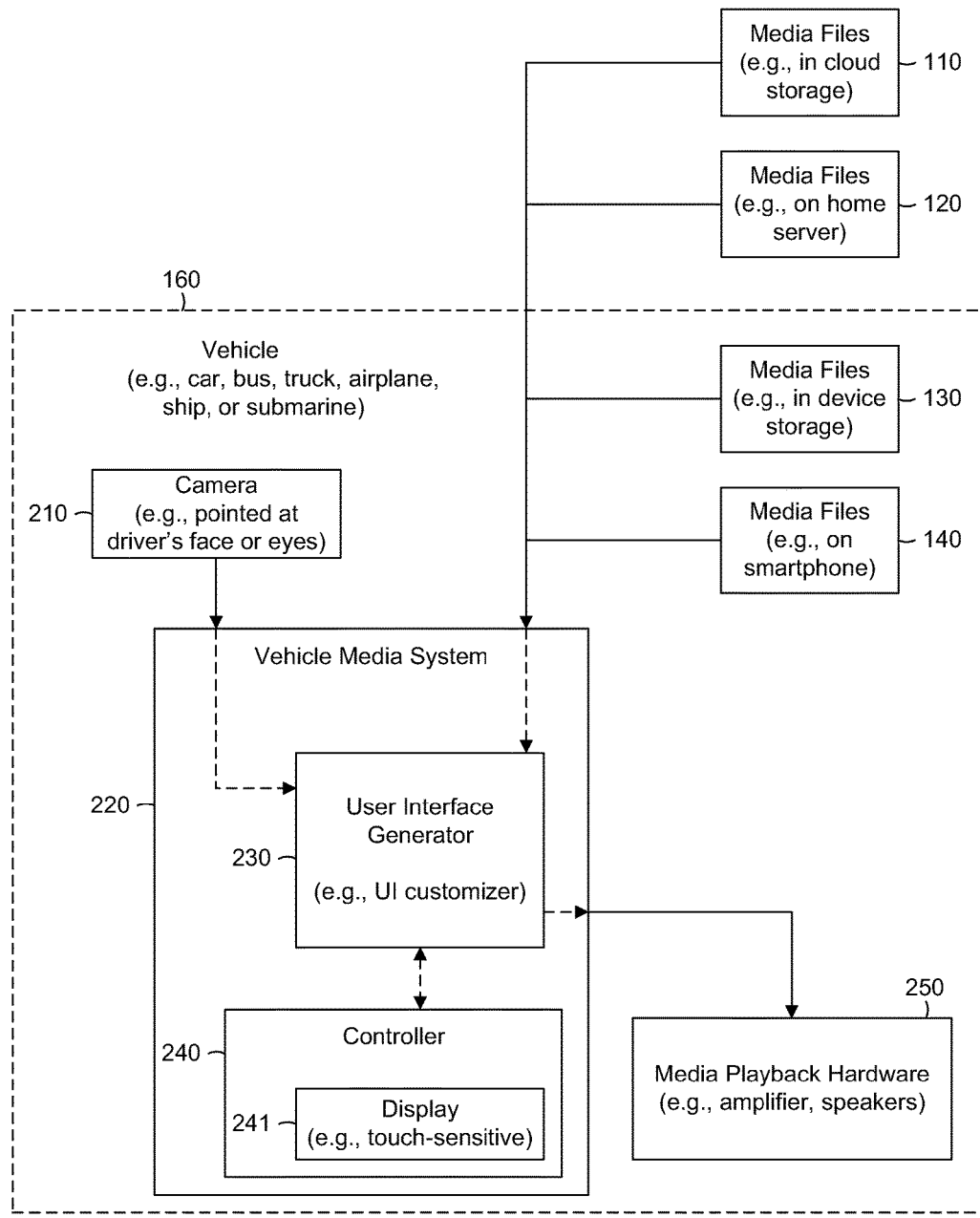
FIG. 2 is a block diagram illustrating components of a vehicle media system, according to some example embodiments.

FIG. 2 is a block diagram illustrating components of a vehicle media system 220, according to some example embodiments. As shown in FIG. 2, the vehicle media system 220 may be included in the vehicle 160. The vehicle media system 220 includes a user interface generator 230, which may be a user interface customizer that customizes user interfaces for one or more users (e.g., user 162). The user interface generator 230 is configured to generate (e.g., create, edit, modify, update, customize, or personalize) a user interface. For example, the user interface generator 230 may generate a user interface (e.g., a 2D or 3D user interface) that depicts a grid having multiple zones, including a zone whose position in the grid corresponds to a mood category. The mood category may characterize one or more media files as being evocative of a mood described by the mood category (e.g., "Peaceful" or "Cool"). Further details of the user interface generator 230 are discussed below with respect to FIG. 4.

The vehicle media system 220 also includes a controller 240 communicatively coupled to the user interface generator 230. The controller 240 is configurable to present the user interface generated by the user interface generator 230. For example, the controller 240 may include a display (e.g., a screen) 241 that is configurable to present the user interface with a grid of multiple zones. Moreover, the controller 240 is able to receive input (e.g., user input) that designates or indicates one or more of the multiple zones as being selected (e.g., by a user). In some example embodiments, the display 241 is wholly or partially touch-sensitive (e.g., a touch screen) that is configurable to display the grid and receive input (e.g., selection input) that corresponds to one or more of the multiple zones. For example, the controller 240 may include an interactive portion that is configurable to receive for detect an input submitted by a user (e.g., user 162 or user 182). The interactive portion of the controller 240 may be integrated into the controller 240 (e.g., a touch-sensitive display 241), implemented using an external device or accessory (e.g., a wired or wireless remote control) of the controller 240, or any suitable combination thereof. According to various example embodiments, the controller 240 may include a keyboard, a mouse, a gesture interface, a voice interface, or any suitable combination thereof.

As shown in FIG. 2, the user interface generator 230 may be communicatively coupled to the media files 110 and 120, as well as to media files 130 and 140. The media files 110 and 120 are described above with respect to FIG. 1. The media files 130 and 140 each may be stored in a database (e.g., a data storage device or machine) accessible within the vehicle 160 (e.g., via a wired or wireless local network). As noted above, such a database may be a media store database (e.g., distinct from the database 150). For example, the media files 130 may be stored in a storage device (e.g., a disk drive or flash drive) within the vehicle 160, and the media files 140 may be stored on a cellular phone (e.g., a smart phone) located in the vehicle 160 (e.g., carried by the user 162). Accordingly, the user interface generator 230 may access any one or more of the media files 110-140, in whole or in part.

The user interface generator 230 may also be communicatively coupled to a camera 210, which may be included (e.g., installed) in the vehicle 160. In some example embodiments, the camera 210 is aimed at a driver of the vehicle 160 (e.g., user 162). Specifically, the camera 210 may be pointed at the driver's face (e.g., pointed at one or more eyes of the driver). This may have the effect of enabling the user interface generator 230 (e.g., via the camera 210) to capture an image that depicts an eye of the driver of the vehicle 160. For example, the image may depict an eye of the driver, both eyes of the driver, or the face of the driver. Such an image may constitute all or part of drowsiness data (e.g., indicating a level of drowsiness in the driver), alertness data (e.g., indicating a level of alertness in the driver), emotion data (e.g., indicating an emotional state of the driver), or any suitable combination thereof, which may be usable by the user interface generator 230 as a basis for generating the user interface (e.g., with the grid of multiple zones). Various example embodiments may utilize drowsiness data, alertness data, emotion data, or any suitable combination thereof, as an indication of the driver's readiness, capability, or skill, or lack thereof, with respect to operation of the vehicle 160, As shown in FIG. 2, the vehicle media system 220 may be communicatively coupled to media playback hardware 250, which may be included in the vehicle 160. The media playback hardware 250 may include one or more hardware components configured or configurable to present all or part of a media file. For example, the media playback hardware 250 may include an amplifier, one or more speakers, a headphone jack, a media decoder, a viewscreen, a projector, or any suitable combination thereof. The media playback hardware may be controlled, in whole or in part, by the user interface generator 230, and the user interface generator 230 may initiate a presentation (e.g., playback) of one or more media files, in whole or in part, via the media playback hardware 250. According to various example embodiments, the media playback hardware may include or communicate with video hardware, image display hardware, image projection hardware, and lighting hardware. Some or all of such hardware may be included in the media playback hardware, an interior of the vehicle 160, an exterior of the vehicle 160, or any suitable combination thereof. Accordingly, the media playback hardware may be usable to display color, video, or imagery that is in alignment and synchronized with attributes of media files currently being played, viewed, or selected.

Figure 3:
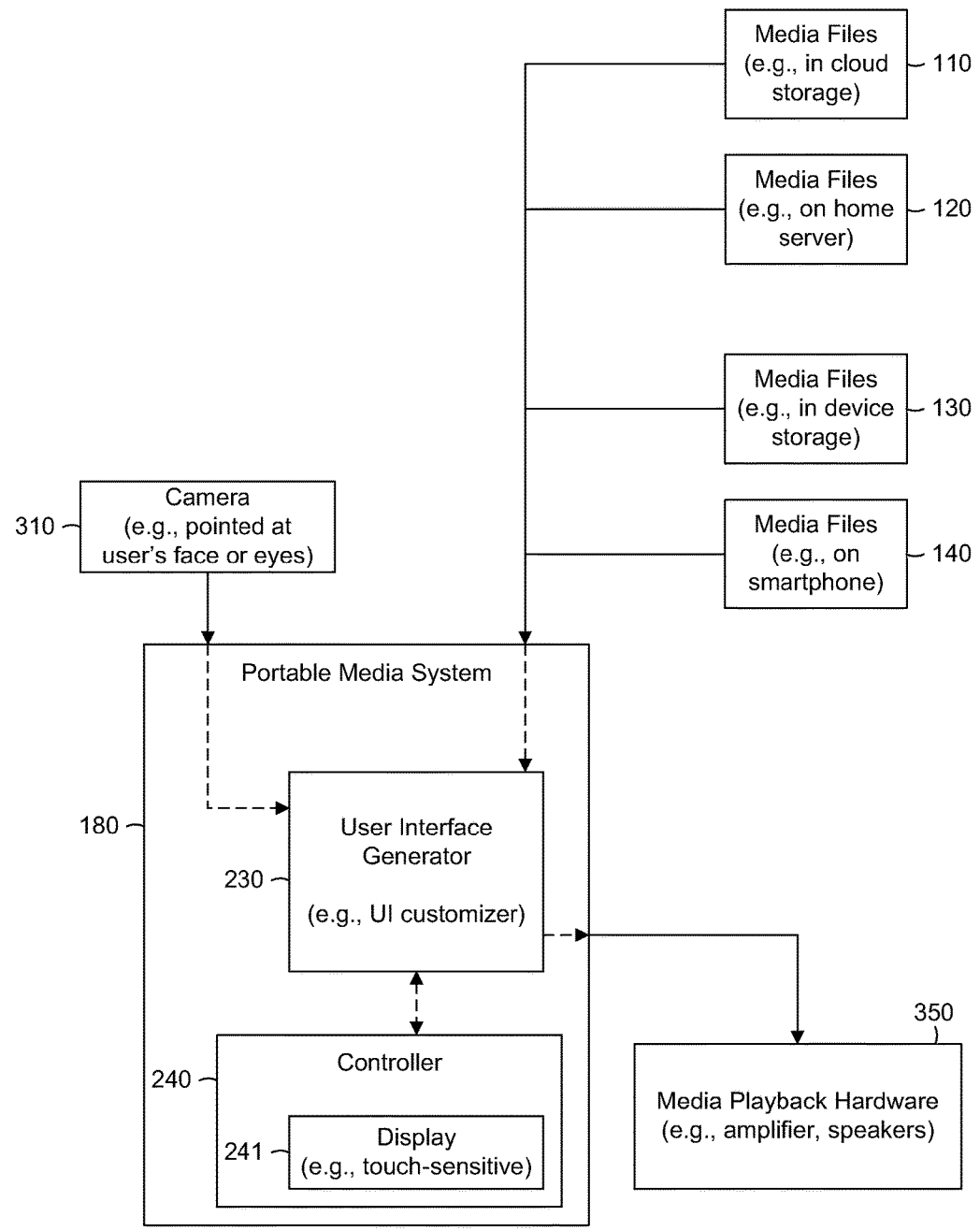
FIG. 3 is a block diagram illustrating components of a portable media system, according to some example embodiments.

FIG. 3 is a block diagram illustrating components of the portable media system 180, according to some example embodiments. As shown in FIG. 3, the portable media system 180 includes a user interface generator 230 (e.g., similar to that described above with respect to FIG. 2), which may be a user interface customizer that customizes user interfaces for one or more users (e.g., user 182). The user interface generator 230 is configured to generate a user interface. For example, the user interface generator 230 may generate a user interface (e.g., a 2D or 3D user interface) that depicts a grid having multiple zones, including a zone whose position in the grid corresponds to a mood category. The mood category may characterize one or more media files as being evocative of a mood described by the mood category (e.g., "Peaceful" or "Cool"). Further details of the user interface generator 230 are discussed below with respect to FIG. 4.

The portable media system 180 also includes a controller 240 (e.g., similar to that described above with respect to FIG. 2) communicatively coupled to the user interface generator 230. The controller 240 is configurable to present the user interface generated by the user interface generator 230. For example, the controller 240 may include a display 241 that is configurable to present the user interface with a grid of multiple zones. Moreover, the controller 240 is able to receive input (e.g., user input) that designates or indicates one or more of the multiple zones as being selected (e.g., by a user). In some example embodiments, the display 241 is wholly or partially touch-sensitive (e.g., a touch screen) that is configurable to display the grid and receive input (e.g., selection input) that corresponds to one or more of the multiple zones. For example, the controller 240 may include an interactive portion that is configurable to receive for detect an input submitted by a user (e.g., user 162 or user 182). The interactive portion of the controller 240 may be integrated into the controller 240 (e.g., a touch-sensitive display 241), implemented using an external device or accessory (e.g., a wired or wireless remote control) of the controller 240, or any suitable combination thereof. According to various example embodiments, the controller 240 may include a keyboard, a mouse, a gesture interface, a voice interface, or any suitable combination thereof.

As shown in FIG. 3, the user interface generator 230 may be communicatively coupled to the media files 110 and 120, as well as to media files 130 and 140. The media files 110 and 120 are described above with respect to FIG. 1, and the media files 130 and 140 are described above with respect to FIG. 2. As examples, the media files 130 may be stored in a storage device (e.g., a disk drive or flash drive) accessible by the portable media system 180 (e.g., carried by the user 182), and the media files 140 may be stored on a cellular phone (e.g., a smart phone) accessible by the portable media system 180 (e.g., carried by the user 182). Accordingly, the user interface generator 230 may access any one or more of the media files 110-140, in whole or in part.

The user interface generator 230 may also be communicatively coupled to a camera 310, which may be connected to the portable media system 180. In some example embodiments, the camera 310 is aimed at a user of the portable media system 180 (e.g., user 182). Specifically, the camera 310 may be pointed at the user's face (e.g., pointed at one or more eyes of the user). This may have the effect of enabling the user interface generator 230 (e.g., via the camera 210) to capture an image that depicts an eye of the driver of the vehicle 160. For example, the image may depict an eye of the user, both eyes of the user, or the face of the user. Such an image may constitute all or part of drowsiness data, alertness data, emotion data, or any suitable combination thereof, which may be usable by the user interface generator 230 as a basis for generating the user interface (e.g., with the grid of multiple zones).

As shown in FIG. 3, the portable media system 180 may be communicatively coupled to media playback hardware 350. In some example embodiments, the media playback hardware 350 is included within the portable media system 180, while in other example embodiments, the media playback hardware 350 is external to the portable media system 180. The media playback hardware 350 may include one or more hardware components configured or configurable to present all or part of a media file. For example, the media playback hardware 350 may include an amplifier, one or more speakers, a headphone jack, a media decoder, a viewscreen, a projector, or any suitable combination thereof. The media playback hardware may be controlled, in whole or in part, by the user interface generator 230, and the user interface generator 230 may initiate a presentation (e.g., playback) of one or more media files, in whole or in part, via the media playback hardware 350. According to various example embodiments, the media playback hardware may include or communicate with video hardware, image display hardware, image projection hardware, and lighting hardware. Some or all of such hardware may be included in the media playback hardware, an interior of the portable media system 180, an exterior of the portable media system 180, or any suitable combination thereof. Accordingly, the media playback hardware may be usable to display color, video, or imagery that is in alignment and synchronized with attributes of media files currently being played, viewed, or selected.

As noted above, some example embodiments combine the portable media system 180 with the vehicle 160 (e.g., with the portable media system 180 communicating with an audio system implemented in the vehicle 160). Accordingly, the portable media system 180 may function as a server that provides a user interface for an audio system of the vehicle 160. Furthermore, in certain example embodiments, the portable media system 180 may be replaced with a server machine (e.g., a cloud-based system of server machines) that is configured to provide the user interface for the audio system of the vehicle 160.

Figure 4:
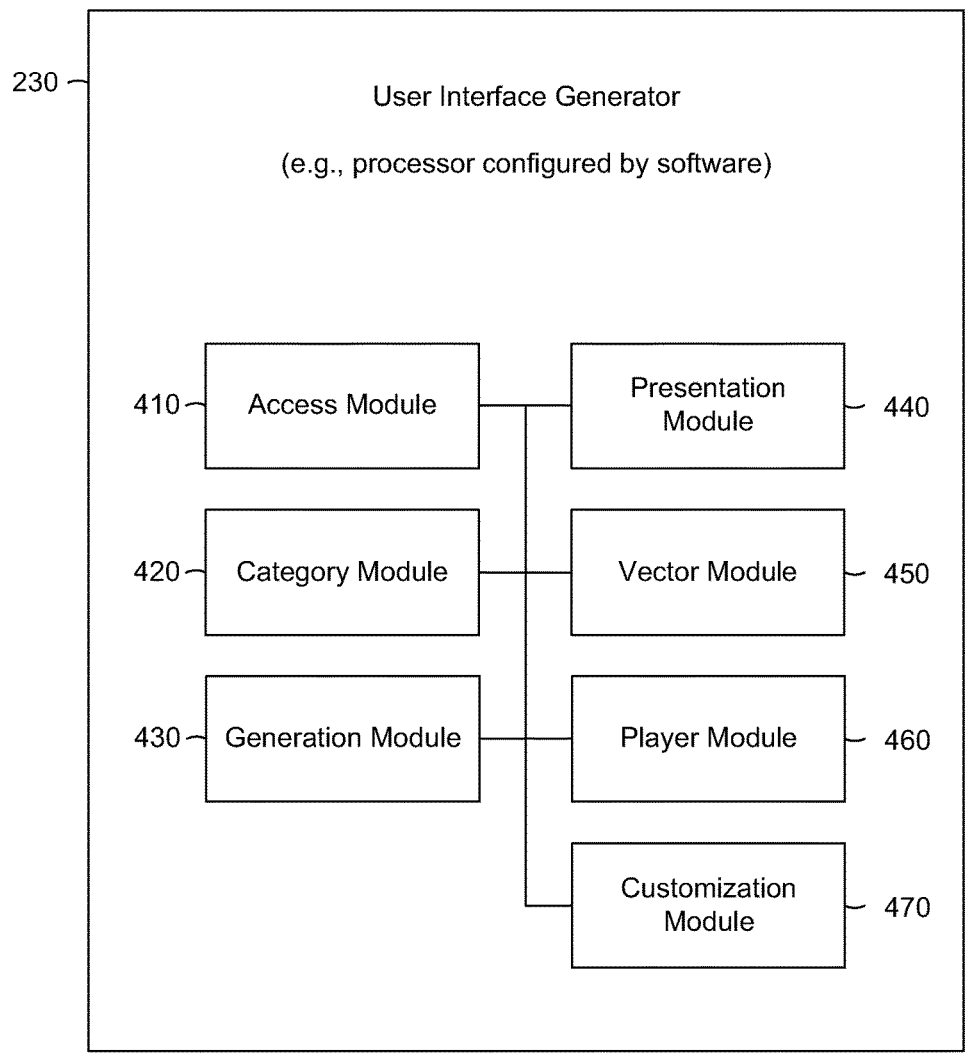
FIG. 4 is a block diagram illustrating components of a user interface generator, according to some example embodiments.

FIG. 4 is a block diagram illustrating components of the user interface generator 230, discussed above with respect to FIG. 2-3, according to some example embodiments. As shown, the user interface generator 230 includes an access module 410, a category module 420, a generation module 430, a presentation module 440, a vector module 450, a player module 460, and a customization module 470, all configured to communicate with each other (e.g., via a bus, shared memory, or a switch). The user interface generator 230 may be implemented by one or more processors of a machine (e.g., configured by software). Moreover, any one or more of the modules described herein may be implemented using hardware (e.g., a processor of a machine) or a combination of hardware and software. Furthermore, any two or more of these modules may be combined into a single module, and the functions described herein for a single module may be subdivided among multiple modules.

The access module 410 is configured to access a media file among a group of media files (e.g., a library or collection of media files, stored within one or more databases). For example, the media files 110-140 may collectively store all or part of a music library belonging to a user (e.g., user 162 or user 182) or a media service accessible by the user, and the access module 410 may access the media file from this music library, in whole or in part. As another example, the media files 110-140 may store (e.g., collectively) all or part of a movie library of the user or a movie library accessible by the user, and the access module 410 may access the media file from this movie library. Hence, the access module 410 may access the media file from the media files 110-140 or any suitable combination thereof.

The category module 420 is configured to determine a mood category of the media file accessed by the access module 410. The mood category may be determined based on a mood vector of the media file. The mood vector may be calculated (e.g., previously calculated, as described below with respect to the vector module 450) based on (e.g., from) acoustic data stored in the media file. According to various example embodiments, the mood vector is determined by retrieving a predetermined (e.g., previously calculated) mood vector stored in a database (e.g., database 150 or a music classification service). Such a predetermined mood vector may be previously calculated using a classifier algorithm that has been trained using human-supervised training. In alternative example embodiments, the mood vector is determined by the user interface generator 230 (e.g., on demand or in real-time), for example, as described below with respect to the vector module 450). As noted above, the acoustic data may be representative of sounds (e.g., music) stored or encoded by the media file. In various example embodiments, the mood vector has multiple components, and one of the multiple components may be a predominant component of the mood vector. Accordingly, the category module 420 may determine the mood category of the media file based on the predominant component of the mood vector. Thus determined, the mood category of the media file may characterize the media file as being evocative of a mood that is described by the mood category (e.g., "Peaceful" or "Cool").

The generation module 430 is configured to generate a user interface (e.g., a 2D or 3D user interface) to the group of media files from which the media file was accessed by the access module 410. As an example, the generation module 430 may generate a user interface to all or part of a music library or movie library belonging to the user (e.g., user 162 or user 182). The user interface may depict a grid that includes multiple zones (e.g., as an arrangement of the multiple zones). The grid may include a zone (e.g., among the multiple zones) whose position in the grid corresponds to the mood category determined by the category module 420 (e.g., based on the predominant component of the mood vector calculated from the media file). Each of the multiple zones may correspond to a different mood category among a set of mood categories, as discussed below with respect to FIG. 5-6. Additional functionality of the generation module 430 is discussed below with respect to FIG. 7-11.

The presentation module 440 is configured to present the user interface generated by the generation module 430. In particular, the presentation module 440 may present (e.g., via the controller 240, the display 241, or both) the user interface with the grid that includes the zone whose position corresponds to the mood category determined by the category module 420. Hence, the zone may be operable within the user interface to select (e.g., indicate, designate, or identify) the mood category or a playlist corresponding to the mood category, for the purpose of initiating one or more actions with respect to the mood category.

According to various example embodiments, the presentation module 440 may present information pertinent to the mood category (e.g., in response to a user-generated selection of the position of the zone that corresponds to the mood category). For example, the presentation module 440 may present a playlist that lists one or more media files associated with the mood category (e.g., characterized as being evocative of the mood described by the mood category). Other examples of information pertinent to the mood category include one or more subcategories of the mood category, a definition of a playlist (e.g., parameters for updating the playlist), a recommendation (e.g., of a media file), a definition or preference for recommendations (e.g., parameters for providing recommendations), a list of preferences or favorites (e.g., preferred or favored media files) of a user, a list of one or more entities or other users (e.g., associated with the user by a social network) related to the mood category, and any suitable combination thereof. Further examples of information pertinent to the mood category include the mood evoked by the mood category, an attribute of the mood category, a degree or level of energy, a degree or level of valence, a number of media files categorized in the mood category, a number of new media files within a period of time, an explicit or implicit preference of a user for the mood category, other historical user behavior related to the mood category, a preference of one or more other users for the mood category, and any suitable combination thereof.

The vector module 450 is configured to generate (e.g., calculate) the mood vector of the media file by performing an analysis of the media file. In particular, the vector module 450 may perform an analysis of acoustic data contained in the media file (e.g., acoustic data representing sounds of the media file). According to various example embodiments, the analysis of the acoustic data may include making a determination of one or more data structures or values. Examples of these data structures or values include a tempo histogram, a chroma histogram, an audio spectrum envelope, an audio spectral flatness, a mel-frequency cepstral coefficient, a modulation of mel-frequency cepstral coefficients, a spectral correlation, a proportion of percussive sounds, a modulation of percussive sounds, a strength of percussive sounds, a strength of non-percussive sounds, a periodicity of percussive sounds, a periodicity of non-percussive sounds, a standard deviation of percussive sounds, a chroma flatness, a chroma eccentricity, a harmonic transition strength, a major key, a minor key, a harmonic feature, a standard deviation of harmonic features, a local tempo, and a standard deviation of local tempos. The determination of the one or more data structures or values may be based on the acoustic data of the media file.

As noted above, the mood vector may have multiple components. The vector module 450 may be configured to determine the one or more of the multiple components, including the predominant component of the mood vector, based on the analysis of the media file (e.g., based on the analysis of the acoustic data). After generating the mood vector, the vector module 450 may provide the mood vector to the category module 420 for determining the mood category of the media file based on the mood vector of the media file. The vector module 450 may generate a mood vector for each media file in a group of media files (e.g., a library or collection of media files) accessible by the access module 410.

The player module 460 is configured to generate a playlist based on the mood category determined by the category module 420. The playlist may identify a subset of the group of media files from which the media file was accessed by the access module 410. In particular, the subset may include the media file accessed by the access module 410. Accordingly, the playlist may reference the media file accessed by the access module 410. The playlist also may characterize the subset as being evocative of the mood described by the mood category. According to various example embodiments, the playlist corresponds to the zone whose position in the grid corresponds to the mood category. Hence, the zone may be operable within the user interface to select (e.g., indicate, designate, or identify) the playlist corresponding to the mood category for the purpose of initiating one or more actions with respect to the playlist.

In some example embodiments, the player module 460 is configured to initiate playback of the playlist, in whole or in part (e.g., playback of one or more files included are listed in the playlist). Playback of the playlist may be initiated based on (e.g., in response to) a user-generated selection of the zone whose position in the grid corresponds to the mood category. According to various example embodiments, the playback of the playlist may be initiated based on drowsiness data (e.g., information indicating a level of drowsiness of, for example, a driver of a vehicle). Such drowsiness data may be generated by the player module 460 based on (e.g., from) image that depicts all or part of the face of a driver of a vehicle (e.g., one or more eyes of the user 162 within the vehicle 160). The player module 460 may be configured to capture the image using one or more cameras (e.g., camera 210). Hence, the player module 460 may select a playlist and initiate its playback based on the level of drowsiness indicated by the image (e.g., playing stimulating music when a driver of a vehicle appears to be sleepy). Similarly, certain example embodiments may utilize drowsiness data, alertness data, emotion data, or any suitable combination thereof, in the manner described with respect to drowsiness data.

In certain example embodiments, the player module 460 is configured to initiate playback of a representative media file (e.g., a representative audio file) that represents the playlist, the mood category corresponding to the playlist, or both. For example, the player module 460 may initiate playback of a "navigational" audio file storing content (e.g., music, sounds, or noise) that expresses the mood of the mood category (e.g., "Peaceful" or "Cool"). Playback of the representative media file may be initiated in response to a user-generated selection of the zone whose position in the grid corresponds to the mood category. As noted above, multiple representative audio files may be presented in this matter. In some example embodiments, for navigational purposes, the representative audio files may be short segments or clips of a complete song or recording. A "navigational" audio file may be a member of the user's collection of media files, an audio file selected from a broader set of audio files, or an audio file synthesized or generated for navigational purposes.

The customization module 470 is configured to receive a user-generated selection of one or more axes for display in the user interface generator by the generation module 430. For example, the customization module 470 may receive an input (e.g., from the user 162 or the user 182) via the controller 240, and the input may select (e.g., indicate, designate, or identify) an axis that represents a range of energy levels descriptive of musical calmness or musical arousal. As another example, the input may select an axis that represents a range of valence levels descriptive of musical valence (e.g., musical positivity or musical darkness). Other example axes that may be selected include axes that represent a group of genres (e.g., genres of music or movies), range of eras (e.g., musical or artistic eras), origins (e.g., national or regional origins) of content in media files, a set of lyrical themes, a group of instrumentation categories, a group of rhythm types, a range of musical tempos, or any suitable combination thereof. The customization module 470 may provide the user-generated selection to the generation module 430 for the purpose of generating the user interface based on the user-generated selection of the one or more axes. Within the generated user interface (e.g., 2D or 3D), a location of a zone may be associated with (e.g., may correspond to) a single mood descriptor (e.g., a single mood category label) that describes the combined values along the one or more axes (e.g., "Bittersweet"). In alternative example embodiments, a location of a zone may be associated with a combination of multiple mood descriptors (e.g., multiple attribute labels) that describe individual values along the one or more axes (e.g., "Calm Positive Jazz").

Figure 5:
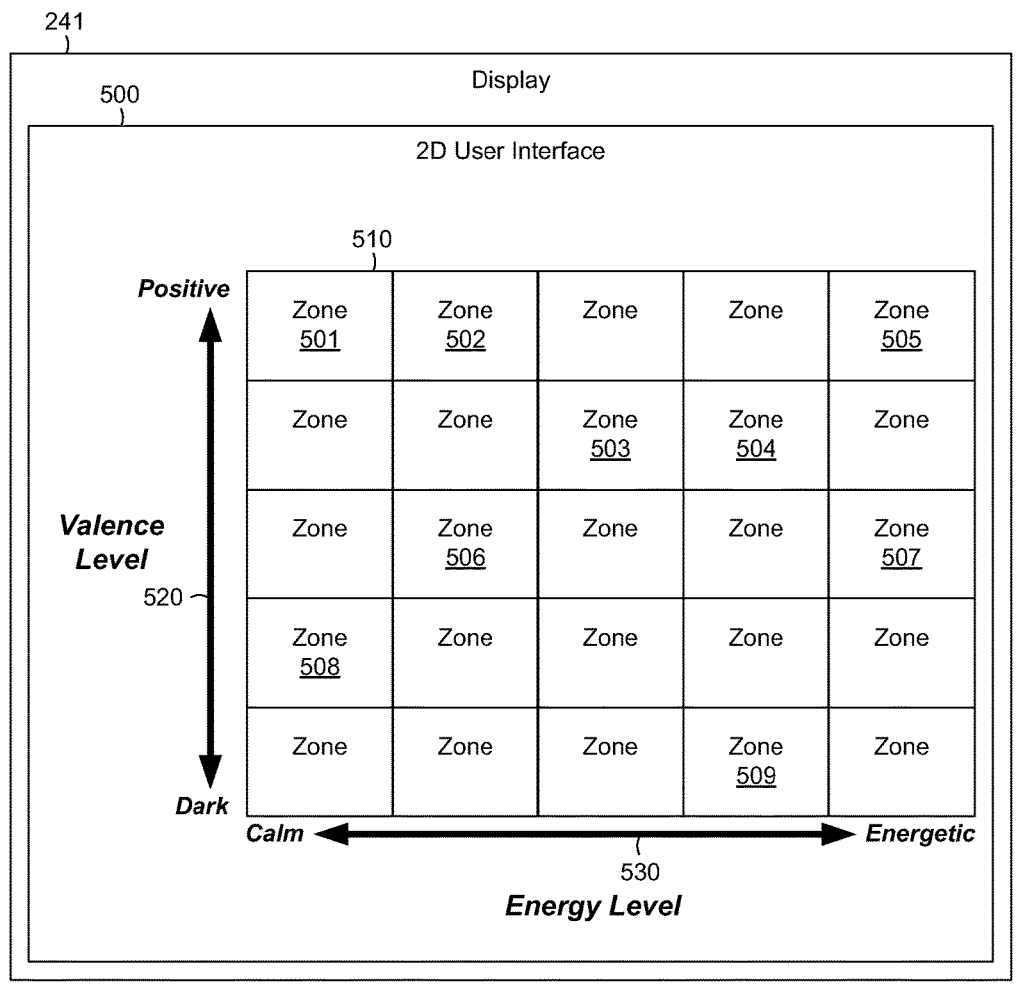
FIG. 5-6 are layout diagrams illustrating a two-dimensional (2D) user interface presented by a display, according to some example embodiments.
Figure 6:
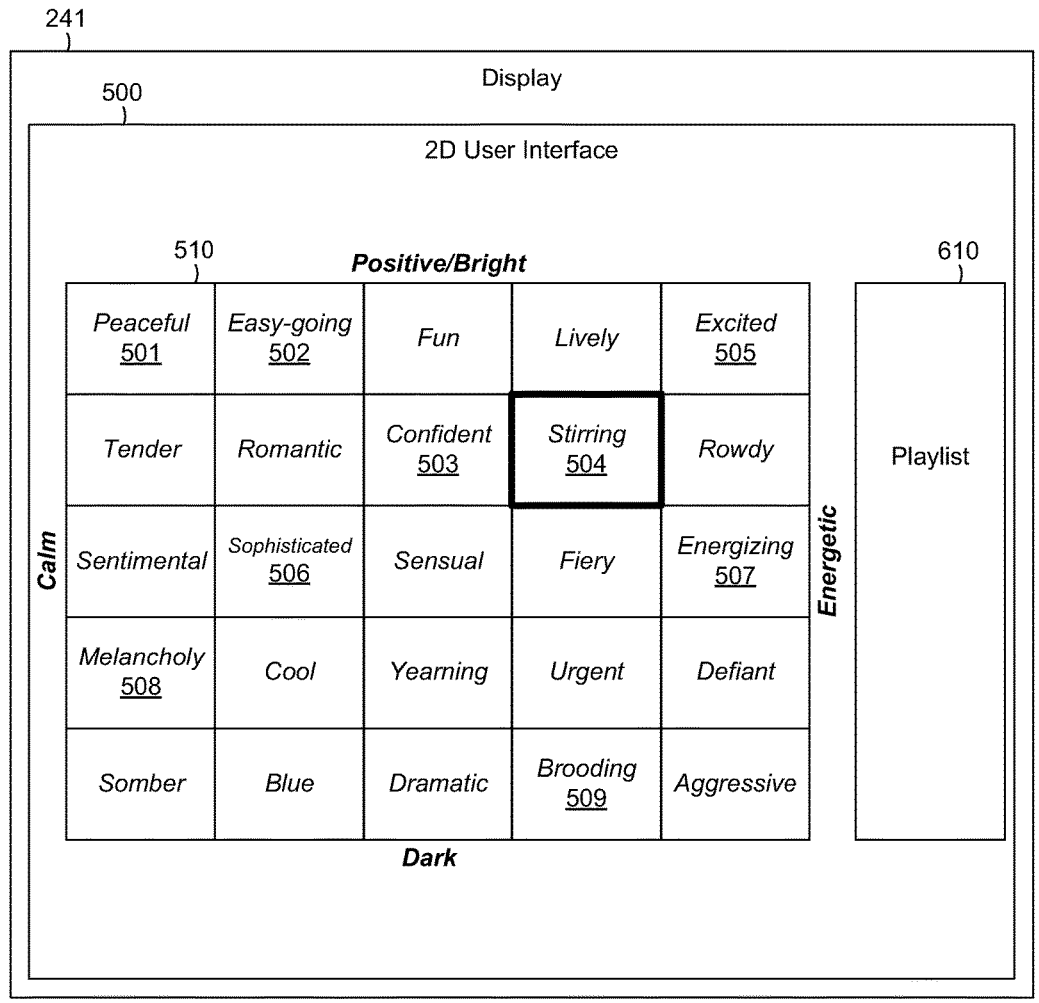

FIG. 5-6 are layout diagrams illustrating a 2D user interface 500 presented by the display 241 of the controller 240, according to some example embodiments. The 2D user interface 500 may be generated by the generation module 430 and presented by the presentation module 440. As shown in FIG. 5, the 2D user interface 500 includes a grid 510 that includes an arrangement of multiple zones (e.g., zones 501-509).

Within the 2D user interface 500 shown in FIG. 5, the grid 510 is presented with a valence axis 520 that represents a range of valence levels among the group of media files (e.g., within the library or collection of media files). The valence levels may be descriptive of musical positivity or musical darkness. For example, a low valence level (e.g., a low positivity level) may indicate high musical darkness, and a high valence level (e.g., a high positivity level) may indicate low musical darkness.

Also presented with the grid 510 shown in FIG. 5 is an energy axis 530 that represents the range of energy levels among the group of media files. The energy levels may be descriptive of musical energy (e.g., a lack of calmness). For example, a low energy level may indicate high musical calmness, and a high energy level may indicate low musical calmness (e.g., high musical energy).

Each of the zones (e.g., zones 501-509) in the grid 510 corresponds to a mood category that may be characterized by the position of the zone relative to the valence axis 520 and relative to the energy axis 530. As examples, the zones 501-505 may have positions in the grid 510 as shown in FIG. 5. The zone 501 is shown as corresponding to a mood category having a very high valence level (e.g., maximally positive or bright) and having a very low energy level (e.g., maximally calm or minimally energetic). The zone 502 is shown as corresponding to another mood category that has the very high valence level (e.g., minimally dark), but has a moderately low energy level. The zone 503 may correspond to a further mood category that has a moderately high valence level, but has a neutral (e.g., moderate or average) energy level. The zone 504 may correspond to yet another mood category having a moderately high valence level and a moderately high energy level. The zone 505 is shown as corresponding to a still further mood category that has a very high valence level and a very high energy level (e.g., maximally energetic or minimally calm).

As additional examples, the zones 506-509 may have positions in the grid 510 as shown in FIG. 5. The zone 506 is shown as corresponding to a mood category with a neutral valence level and a moderately low energy level. The zone 507 may correspond to a mood category having the neutral valence level, but also having a very high energy level. The zone 508 is shown as corresponding to a mood category that has a moderately low valence level and a very low energy level. The zone 509 may correspond to the mood category that has a very low valence level and a moderately high energy level.

According to various example embodiments, the grid 510 may be 2D, 3D, or any suitable combination thereof. The grid 510 may be any arrangement, map, or layout of zones (e.g., zones 501-509), and the zones may have any shape (e.g., square, rectangular, circular, elliptical, oval, polygonal, or free-form). Moreover, the zones may in shape with respect to each other, and the zones may vary in size (e.g., area) with respect to each other. Furthermore, the zones may be discreet and mutually exclusive. Various example embodiments of the grid 510 have the zones are arranged as a square, a rectangle, a circle, a ring, or any suitable combination thereof.

Within the grid 510, each zone may be located based on one or more values of attributes that describe the mood category corresponding to the zone. For example, the energy level of the mood category may determine the location of the corresponding zone along a horizontal axis (e.g., x-axis) of the grid 510, and the valence (e.g., positively) level of the mood category may determine the location of the corresponding zone along a vertical axis (e.g., y-axis) of the grid 510. As another example, a mood category may have a dominance level that determines the location of the corresponding zone along an axis (e.g., a horizontal axis) of the grid 510, as well as an intensity level that determines the location of the corresponding zone along another axis (e.g., a vertical axis of the grid 510. As a further example, the mood category may correspond to a genre and accordingly may have an intensity level that determines the location of the zone along an axis (e.g., a horizontal axis) of the grid 510, as well as a groove level or descriptor that determines the location of the zone along another axis (e.g., in a vertical axis) of the grid 510.

As shown in FIG. 6, one or more of the zones (e.g., zones 501-509 shown in FIG. 5) in the grid 510 may be labeled with one or more descriptors (e.g., mood descriptors). The zone may be labeled with a descriptor (e.g., a word, phrase, symbol, or code) that describes the mood category corresponding to the zone or to its position in the grid 510. For example, the zone 501 may be labeled as "Peaceful." The zone 502 is shown with the label "Easy-going." The zone 503 may be labeled "Confident." The zone 504 may be labeled as "Stirring." The zone 505 is shown with the label "Excited." The zone 506 is shown with the label "Sophisticated." The zone 507 may be labeled as "Energizing." The zone 508 is shown with the label "Melancholy." The zone 509 is labeled "Brooding" in FIG. 6.

In some example embodiments, the grid 510 and its zones (e.g., zones 501-509) may be presented using multiple colors (e.g., hues, saturations, or both), brightness (e.g., luminance) values, or both, to indicate or suggest the various mood categories corresponding to the zones. For example, a certain color (e.g., a certain hue or saturation) or a low brightness value may be used for mood categories with a low energy level, while another color or a high brightness value may be used for mood categories with a high energy level. As another example, a blue color may be used for mood categories with a low valence level (e.g., dark valence or low positivity), while a red color may be used for mood categories with a high valence level (e.g., positive valence or high positivity).

The zone 504 is shown in FIG. 6 as being highlighted (e.g., by thick border lines). According to various example embodiments, a zone (e.g., zone 504) may be highlighted to indicate that it or its corresponding mood category has been selected or otherwise identified for one or more subsequent or concurrent actions. Multiple zones may be highlighted. The highlighting of a zone may be accomplished by one or more visual techniques, including coloring the zone differently from other zones (e.g., adjacent zones), outlining the zone differently from other zones, displaying the zone with a different brightness than other zones, using time-variant visual techniques (e.g., flashing or animation), or any suitable combination thereof.

Also shown in FIG. 6 is a playlist 610, which may be generated by the player module 460. As noted above, the playlist 610 may identify a subset of the group of media files (e.g., the library or collection of media files) from which the access module 410 accesses the media file. In conjunction with the highlighting of the zone 504, the presentation of the playlist 610 in the 2D user interface 500 may indicate that the playlist 610 corresponds to the mood category for the zone 504 (e.g., "Stirring"). According to various example embodiments, the playlist 610 may be fully or partially shown in the user interface 500. For example, the playlist 610 may display only a portion of the subset characterized as being evocative of the mood described by the mood category for the zone 504. As another example, the playlist 610 may display the full subset of the media files.

Figure 7:
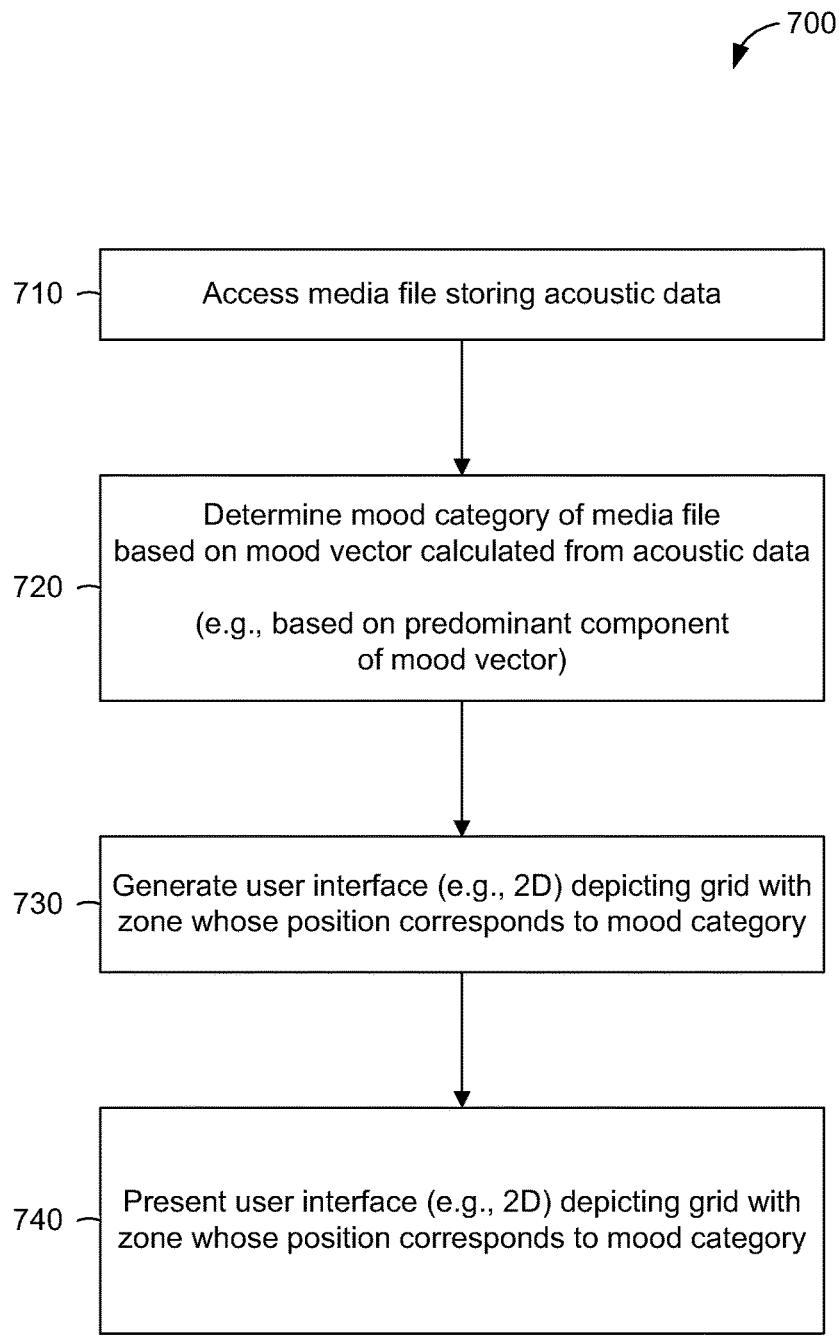
FIG. 7-11 are flowcharts illustrating operations of a user interface generator in performing a method of providing a user interface to media files, according to some example embodiments.

FIG. 7-11 are flowcharts illustrating operations of the user interface generator 230 in performing a method 700 of generating and presenting the 2D user interface 500, according to some example embodiments. Operations in the method 700 may be performed by a media system (e.g., vehicle media system 220 or portable media system 180) with the user interface generator 230, using modules described above with respect to FIG. 4. As shown in FIG. 7, the method 700 includes operations 710, 720, 730, and 740.

In operation 710, the access module 410 accesses a media file from a group of media files. The group of media files may be stored, in whole or in part, by the media files 110-140, as discussed above with respect to FIG. 2-3. As noted above, the accessed media file may store acoustic data that is representative of sounds (e.g., encoded or otherwise represented in the media file).

In operation 720, the category module 420 determines a mood category of the media file. As noted above, the determination of the mood category may be based on the mood vector that is calculated from the acoustic data of the media file. For example, the determination of the mood category may be based on a predominant component of the mood vector. The determined mood category may characterize the media file as being evocative of a mood described by the mood category (e.g., described by a descriptor that corresponds to the mood category).

As noted above, the mood vector may be retrieved as a predetermined (e.g., previously calculated) mood vector stored in a database (e.g., database 150 or a music classification service). Such a predetermined mood vector may be previously calculated using a classifier algorithm that has been trained using human-supervised training. In alternative example embodiments, the mood vector may be determined by the user interface generator 230 (e.g., on demand or in real-time), for example, as described below with respect to FIG. 11). Further details of operation 720 are discussed below with respect to FIG. 8.

In operation 730, the generation module 430 generates the 2D user interface 500, which is discussed above with respect to FIG. 5-6. As noted above, the 2D user interface 500 may depict the grid 510, and the grid 510 may include the zone (e.g., zone 501) whose position in the grid 510 corresponds to the mood category determined in operation 720. As noted above, the grid 510 may be generated as a hierarchy of mood categories in mood sub-categories, where the hierarchy may have multiple levels or layers (e.g., a top level of 25 mood categories, a middle level of 100 mood sub-categories, and a lower level of 400 mood sub-categories). Moreover, such a hierarchy may be adapted or modified based on an analysis of music files accessible by the user interface generator 230, listening behavior of a user (e.g., user 162 or user 182), or any suitable combination thereof. As described above in discussing a personalized grid (e.g., grid 510), multiple mood sub-categories at one level of the hierarchy (e.g., the middle level) may be aggregated up into their parent mood category in the hierarchy (e.g., the top-level). In some example embodiments, a subset of the most prominent mood sub-categories at one level of the hierarchy (e.g., the 25 most prominent mood sub-categories in the middle level) may be adapted (e.g., expanded, shrunk, or resized) to form a personalized set of mood categories at a higher level of the hierarchy (e.g., as a unique set of 25 top level mood categories in a 5×5 arrangement of the grid 510). In certain example embodiments, a combination of these two approaches is used. For example, a personalized top level 5×5 arrangement of the grid 510 may be generated by emerging sparsely populated middle level mood sub-categories into a single top level parent mood category, while also elevating densely populated middle level mood sub-categories as separate independent top level mood categories.

In operation 740, the presentation module 440 presents the 2D user interface 500 (e.g., to the user 162 of the vehicle media system 220, or to the user 182 of the portable media system 180). For example, the 2D user interface 500 may be presented by displaying the 2D user interface 500 on a display (e.g., a touch-sensitive display). In particular, the presentation module 440 may present the 2D user interface 500 using the controller 240, which may include displaying the 2D user interface 500 on the display 241 of the controller 240.

Figure 8:
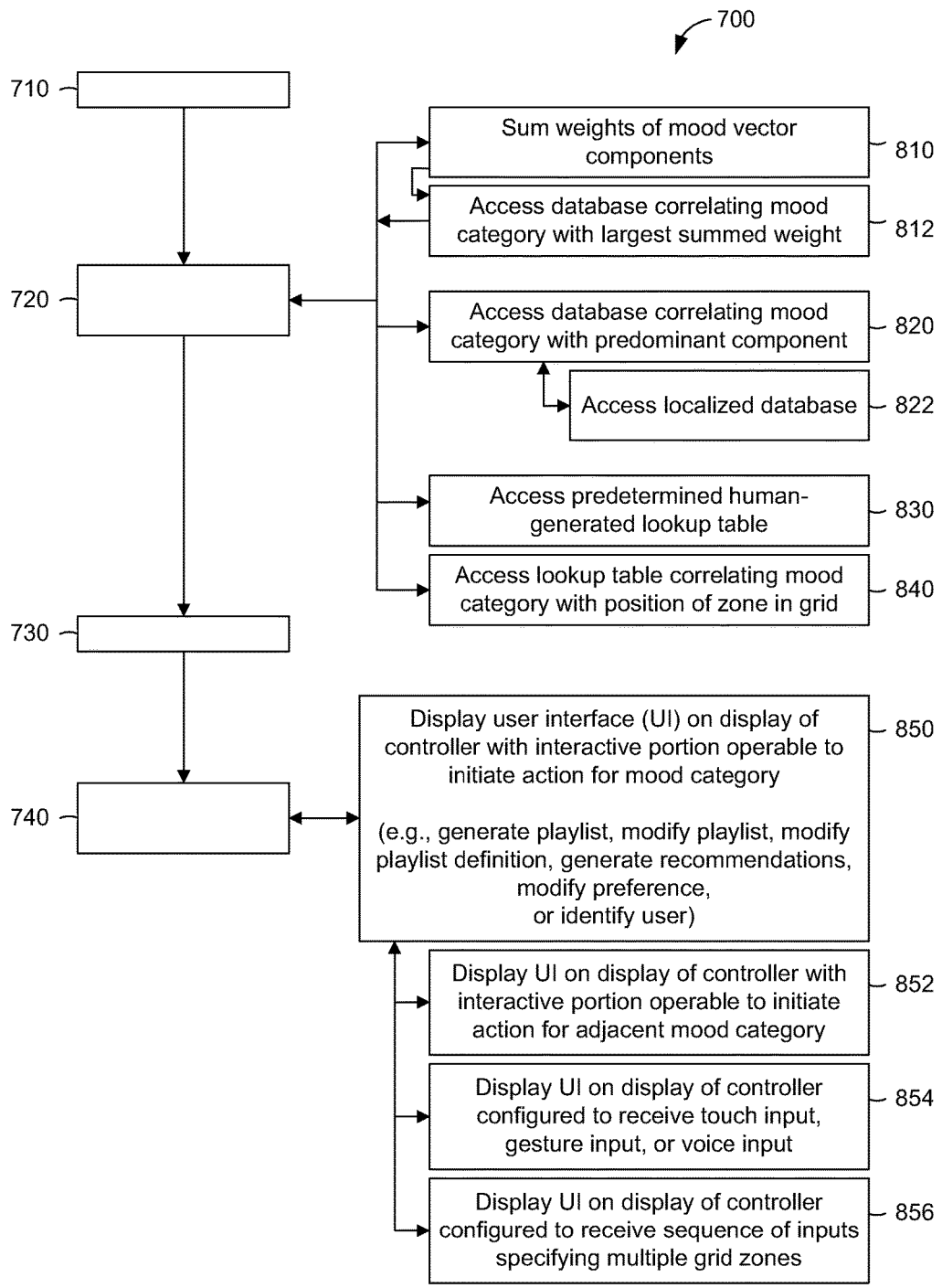

As shown in FIG. 8, the method 700 may include one or more of operations 810, 812, 820, 822, in 830, 840, 850, 852, 854, and 856, according to various example embodiments. One or more of operations 810-840 may be performed by the category module 420. One or more of operations 850-856 may be performed by the presentation module 440.

Operations 810 and 812 may be performed as part (e.g., a precursor task, a subroutine, or a portion) of operation 720, in which the category module 420 determines the mood category of the media file based on the mood vector calculated from the acoustic data of the media file. As noted above, the mood vector may have multiple components. These multiple components may contribute to a predominant component of the mood vector in a non-uniform manner. That is, each of the multiple components may contribute its own influence (e.g., weight) to the predominant component. In operation 810, the category module 420 sums the influences (e.g., weights) of the multiple components of the mood vector. This may have the effect of determining the predominant component as being the component with a largest sum of influences (e.g., the largest weight) among the multiple components of the mood vector. In operation 812, the category module 420 accesses the database 150, which may correlate the largest sum of influences (e.g., the largest weight among the summed weights) with the mood category that characterizes the media file. Accordingly, the mood category may be determined based on the largest sum of influences, in operation 720.

Operation 820 may be performed as part of operation 720. In operation 820, the category module 420 accesses a database (e.g., database 150) that correlates the predominant component of the mood vector with the mood category that characterizes the media file. For example, the database 150 may store a lookup table that correlates the predominant component of the mood vector with the mood category. Accordingly, the mood category may be determined based on an efficient lookup operation.

In some example embodiments, operation 822 is performed as part of operation 820. The database accessed in operation 820 may be a localized database. That is, the database may be localized to a particular geographical location (e.g., country, time zone, city, or neighborhood). In operation 822, the category module 420 accesses the localized database. The localized database may be one of several localized databases available for access by the category module 420, some or all of which may be stored by the database 150. For example, one localized database (e.g., a first localized database) may correlate the predominant component of the mood vector with a localized descriptor (e.g., a first localized descriptor) of the mood category, while another localized database (e.g., a second localized database) may correlate the predominant component with a different localized descriptor (e.g., a second localized descriptor) for the same mood category. The first localized descriptor may describe the mood of the mood category using a word or phrase that is meaningful within one cultural or linguistic tradition that corresponds to a geographic region (e.g., United States), while the second localized descriptor may describe the same mood of the same mood category using a different word or phrase that is meaningful within another cultural or linguistic tradition that corresponds to another geographic region (e.g., Japan). The use of multiple localized databases may enable the category module 420 to select an appropriate (e.g., locally clear and meaningful) descriptor for the determined mood category.

Operation 830 may be performed as part of operation 720. In operation 830, the category module 420 accesses a predetermined human-generated lookup table (e.g., from the database 150) that references the mood category. In some example embodiments, the lookup table may map the multiple components of the mood vector to multiple mood categories (e.g., including the mood category that characterizes the media file). For example, the lookup table may correlate the predominant component of the mood vector with the mood category that characterizes the media file. As another example, the lookup table may correlate the predominant component with the largest sum of influences discussed above with respect to operations 810 and 812. In some example embodiments, access to the lookup table is provided as a service (e.g., a subscription service) to a user of a media system (e.g., to the user 162 or the user 182).

Operation 840 may be performed as part of operation 720. In operation 840, the category module 420 accesses a lookup table (e.g., from the database 150) that correlates the mood category of the media file with a position of the zone (e.g., zone 501) in the grid 510. For example, the lookup table may map the positions of the zones (e.g., zones 501-509) of the grid 510 to multiple mood categories. As a more specific example, the lookup table may map each mood category to a specific zone position within the grid 510. The position of the zone may be represented in the lookup table by 2D coordinates (e.g., an x-coordinate and a y-coordinate, stored as a coordinate pair or a 2D vector). In some example embodiments, the multiple mood categories may be described in the lookup table by localized descriptors, as discussed above with respect to operation 822.

Operation 850 may be performed as part of operation 740, in which the presentation module 440 presents the 2D user interface 500. In operation 850, the presentation module 440 displays the 2D user interface 500 on the display 241 of the controller 240. As noted above with respect to FIG. 2-3, the controller 240 may have or include an interactive portion (e.g., all or part of the display 241) that is operable to initiate one or more actions directed to one or more mood categories (e.g., according to a user-generated selection of the one or more mood categories). According to various example embodiments, the interactive portion of the controller 240 that is operable to initiate an action may overlap with the zone (e.g., zone 501) whose position in the grid 510 corresponds to the mood category of the media file (e.g., as determined in operation 720). Examples of an action that may be initiated via the interactive portion of the controller 240 include generating a playlist for the mood category, displaying the playlist for the mood category, editing the playlist for the mood category, modifying a definition of the playlist for the mood category, playing all or part of the playlist for the mood category, generating a recommendation based on (e.g., from) the mood category, modifying a definition or preference for generating recommendations based on the mood category, updating a list of preferences or favorites of a user (e.g., user 162 or user 182), or presenting one or more other users (e.g., user 172) related to the mood category.

One or more of operations 852, 854, and 856 may be performed as part of operation 850, in which the presentation module 440 displays the 2D user interface 500 on the display 241 of the controller 240. In operation 852, the presentation module 440 displays the 2D interface 500 on the display 241 of the controller 240, where the interactive portion of the controller 240 (e.g., all or part of the display 241) is operable to initiate one or more actions for the mood category that is adjacent to the mood category that characterizes the media file. In other words, the interactive portion may be operable to initiate an action with respect to a further mood category that corresponds to a further zone (e.g., zone 502) adjacent to the zone (e.g., zone 501) to which the mood category of the media file corresponds. This may have the effect of enabling a user (e.g., user 162) to select multiple zones (e.g., zones 501 and 502) as being subject to the action. In some example embodiments, the action is initiated with a greater degree of effect for an explicitly selected zone (e.g., zone 501) then for an adjacent zone (e.g., zone 502). For example, where the action is playback of playlists, media files from the playlist corresponding to the explicitly selected mood category (e.g., a playlist of "Peaceful" media files) may be more frequently played (e.g., more likely to be played) than media files from the playlist corresponding to an adjacent mood category (e.g., a playlist of "Easy-going" media files).

In operation 854, the presentation module 440 displays the 2D interface 500 on the display 241 of the controller 240, where the interactive portion of the controller 240 is configured to receive a keyboard input, keypad input, a mouse input, a touch input, a gesture input, a voice input, or any suitable combination thereof. According to various example embodiments, a gesture input may be a motion input (e.g., a detected movement) from a body part of a user (e.g., user 162 or user 182). Examples of such body parts include a hand, a finger, a hat, a shoulder, a torso, a leg, a face, or any portion thereof. The interactive portion of the controller 240 may be configured to receive a gesture input directly or via a camera (e.g., camera 210 or camera 310). In some example embodiments, the camera may be a stereoscopic camera, infrared camera or an ultrasound camera.

In operation 856, the presentation module 440 displays the 2D interface 500 on the display 241 of the controller 240, where the interactive portion of the controller 240 (e.g., all or part of the display 241) is configured to receive a sequence of inputs that specify multiple zones (e.g., zones 505, 504, 503, 506, and 508, in that order) of the grid 510. That is, the controller 240 may be configured to receive the sequence of inputs as a selection of multiple mood categories in sequential order (e.g., as a path, a plan, an arc, or a route through the multiple mood categories selected). For example, with reference to FIG. 5-6, the sequence of inputs may select the zones 505, 504, 503, 506, and 508, in order, and the controller 240 may receive this sequence as an ordered plan (e.g., requests) to play media files from an "Excited" playlist, a "Stirring" playlist, a "Confident" playlist, a "Sophisticated" playlist, and a "Melancholy" playlist. Accordingly, a user (e.g., user 162 or user 182) may program a media system to play multiple sets of media files (e.g., multiple sets of a predetermined number of media files), where each of the multiple sets is characterized by a sequentially selected mood category.

Figure 9:
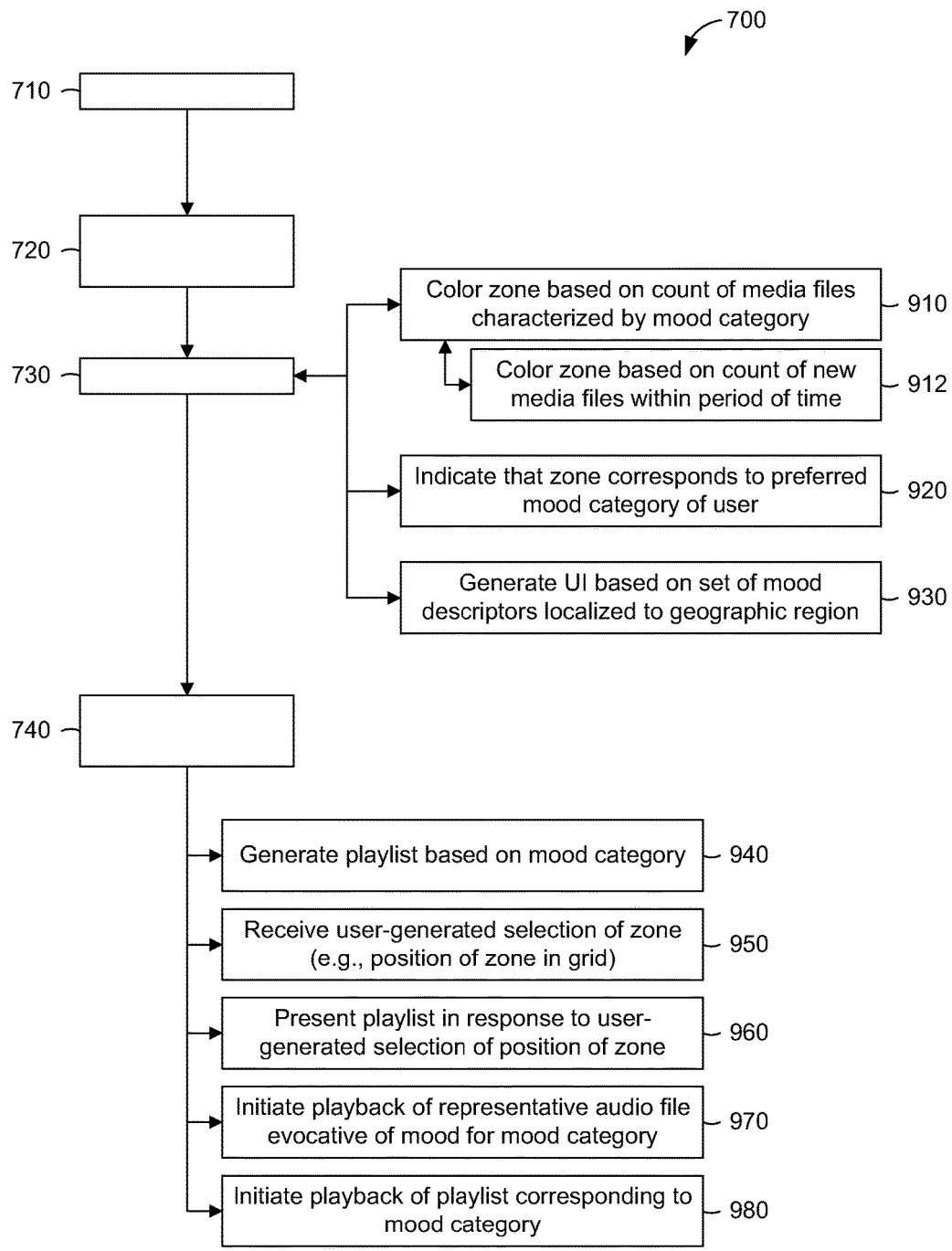

As shown in FIG. 9, the method 700 may include one or more of operations 910, 912, 920, 930, 940, 950, 960, 970, and 980. One or more of operations 910, 920, 930 may be performed as part (e.g., a precursor task, a subroutine, or a portion) of operation 730, in which the generation module 430 generates the 2D user interface 500.

In operation 910, the generation module 430 highlights the zone (e.g., zone 501) whose position in the grid 510 corresponds to the mood category determined in operation 720. As noted above, highlighting the zone may include one or more visual techniques (e.g., application of one or more visual attributes). In particular, the generation module 430 may color the zone. In some example embodiments, the zone is colored based on a count of media files characterized by the mood category (e.g., the number of media files categorized by the mood category).

According to certain example embodiments, operation 912 may be performed as part of operation 910. In operation 912, the highlighting (e.g., coloring) of the zone is based on a count of media files that are characterized by the mood category within a period of time (e.g., a predetermined period of time or a user-configured period of time). That is, the generation module 430 may highlight the zone based on the number of new media files recently categorized into the mood category.

In operation 920, the generation module 430, in generating the 2D user interface 500, may indicate that the zone (e.g., zone 501) whose position corresponds to the mood category also corresponds to a preferred mood category of a user (e.g., user 162 or user 182). For example, the generation module 430 may generate the 2D user interface 500 with an indication (e.g., highlighting) that the zone corresponds to a favorite or frequently selected mood category (e.g., based on historical interactions by one or more users).

In operation 930, the generation module 430 generates the 2D user interface 500 based on a set of descriptors (e.g., mood descriptors) that are localized to a geographic region.

As discussed above with respect to operation 822, a localized database may correlate the mood vector of the media file, or its predominant component, with a localized descriptor of the mood category determined in operation 720. As noted above, the localized descriptor may describe the mood of the mood category using a word or phrase that is meaningful within a particular cultural or linguistic tradition that corresponds to the geographic region. Moreover, the localized descriptor may be one of multiple localized descriptors that are mapped to multiple mood categories (e.g., within a localized database). Accordingly, the generation module may use (e.g., by inclusion) one or more localized descriptors in generating the 2D user interface 500.

One or more of operations 940-980 may be performed subsequent to operation 740, in which the presentation module 440 presents the 2D user interface 500 (e.g., via the controller 240, the display 241, or both). In operation 940, a player module 460 generates the playlist 610 based on the mood category determined in operation 720. As noted above, the playlist 610 may identify a subset of the group of media files (e.g., the library or collection of media files) from which the media file was accessed in operation 710. This subset may include the media file accessed in operation 710, and the playlist 610 may reference the media file accessed in operation 710. Once generated, the playlist 610 may be presented.

In operation 950, the controller 240 receives a user-generated selection of the zone (e.g., zone 501) whose position in the grid 510 corresponds to the mood category determined in operation 720. For example, the controller 240 may receive the user-generated selection by detecting a touch on the display 241. According to various example embodiments, the user-generated selection selects the zone, its position in the grid 510, its corresponding mood category, its corresponding descriptor (e.g., mood descriptor), or any suitable combination thereof. In response, the player module 460 may detect the user-generated selection.

In operation 960, presentation module 440 presents the playlist 610 within the 2D user interface 500 (e.g., as discussed above with respect to FIG. 6). The presentation of the playlist 610 may be based on (e.g., in response to) the user-generated selection of the zone (e.g., zone 501) whose position corresponds to the mood category determined in operation 720.

According to various example embodiments, operation 960 is replaced with an initiation of an action with respect to (e.g., directed at) the mood category that corresponds to the zone. As noted above, examples of the action include generating a playlist for the mood category, displaying of the playlist, editing the playlist, modifying a definition of the playlist, playing the playlist, generating a recommendation, modifying a definition or preference for generating recommendations, updating a list of preferences or favorites of a user, or presenting other users related to the mood category. The action may include presenting information pertinent to the mood category (e.g., a number of media files categorized in the mood category, a number of new media files within a period of time, a preference of a user for the mood category, or a preference of one or more other users for the mood category. Further examples of the action include presenting one or more sub-categories of the mood category (e.g., as a further grid of sub-categories) in response to user-generated selection. For example, the user-generated selection may select a particular mood category (e.g., "Cool"), and the action may be presentation of a further grid of sub-categories for the particular mood category (e.g., "Casual Groove," "Cool Confidence," "Wary/Defiant," and "Dark Groovy").

In operation 970, the player module 460 initiates playback of a representative media file (e.g., a representative or navigational audio file). The representative media file may be evocative of the mood described by the mood category determined in operation 720. The initiating of the playback of the representative media file may be based on (e.g., in response to) the user-generated selection of the zone (e.g., zone 501) whose position corresponds to the mood category.

In operation 980, the player module 460 initiates playback of the playlist 610, in whole or in part (e.g., one or more media files listed in the playlist 610). As noted above, the playlist 610 may be generated by the player module 460. The initiating of the playback of the playlist 610 may be based on (e.g., in response to) the user-generated selection of the zone (e.g., zone 501) whose position corresponds to the mood category.

Figure 10:
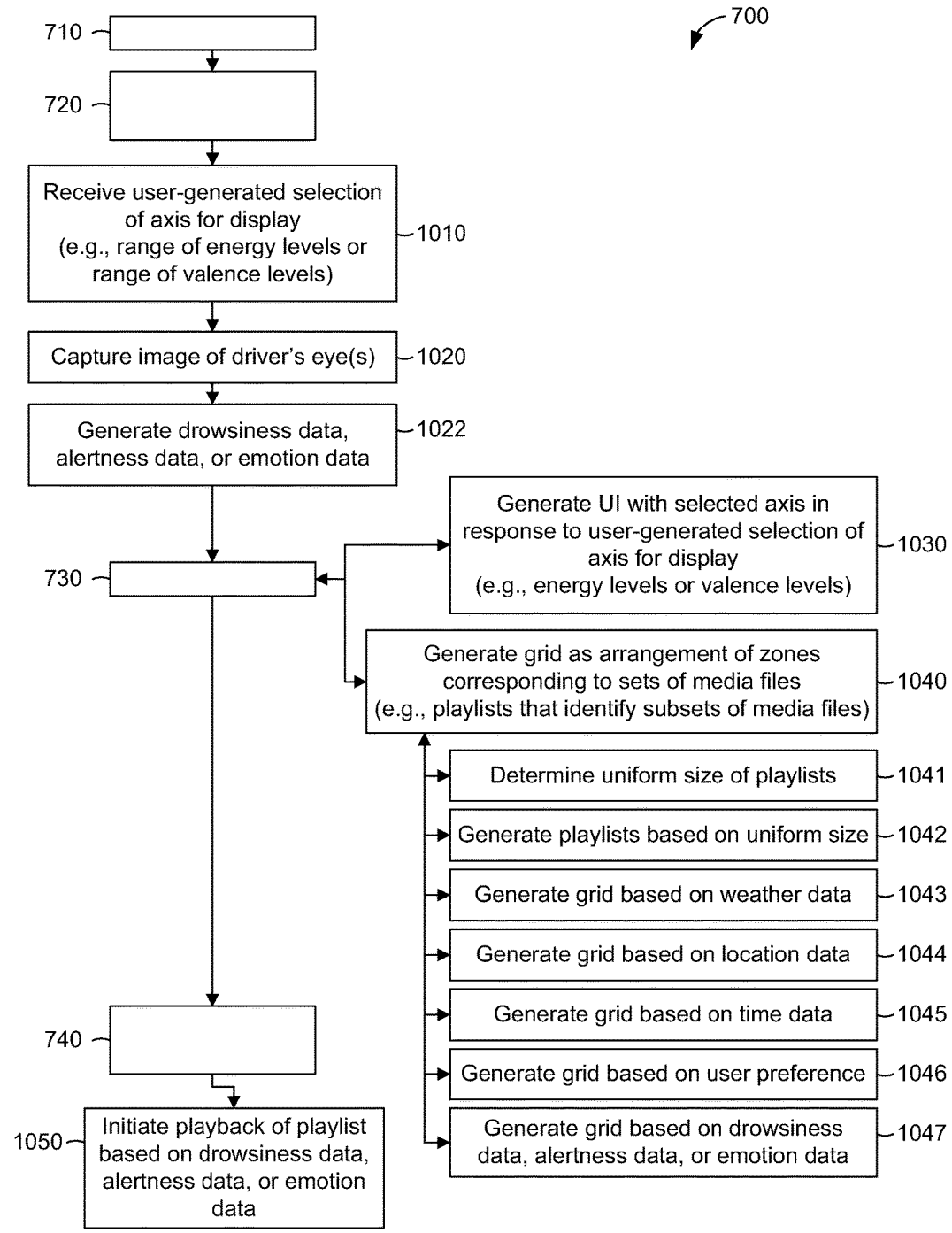

As shown in FIG. 10, the method 700 may include one or more of operations 1010, 1020, 1022, 1030, 1040, and 1050. In operation 1010, the customization module 470 receives a user-generated selection of an axis for displaying on the display 241 of the controller 240 (e.g., in the 2D user interface 500 to be generated in operation 730). For example, the user-generated selection may select the valence axis 520 for display. As another example, the user-generated selection may select the energy axis 530 for display. According to various example embodiments, the user-generated selection made be generated by a user (e.g., user 162 or user 182) a developer, or a machine. Based on (e.g., in response to) the user-generated selection received in operation 1010, the generation module 430 may generate the 2D user interface 500 to include and display the selected axis. As noted above with respect to FIG. 4, other axes may be selected, according to various example embodiments.

In operation 1020, the player module 460 captures an image that depicts all or part of the face of a driver of a vehicle (e.g., one or more eyes of the user 162 within the vehicle 160). The player module 460 may capture the image using one or more cameras (e.g., camera 210) accessible by the player module 460.

In operation 1022, the player module 460 generates drowsiness data based on (e.g., from) the image captured in operation 1020. In some example embodiments, the drowsiness data includes at least a portion of the image. In certain example embodiments, the drowsiness data is generated based on an analysis of some or all of the image (e.g., a portion of the image depicting one or more eyes of the driver of the vehicle). Similarly, certain example embodiments may generate and utilize drowsiness data, alertness data, emotion data, or any suitable combination thereof, in the manner described with respect to drowsiness data.

In operation 1030, the generation module 430 generates the 2D user interface 500 based on (e.g., in response to) the user-generated selection of the axis for display, as received in operation 1010. For example, the user-generated selection may select the valence axis 520 for display, and the generation module 430 may generate the 2D user interface 500 to include the valence axis 520. As another example, the user-generated selection may select the energy axis 530 for display, and the generation module 430 may generate the 2D user interface 500 to include the energy axis 530. As noted above, other axes may be selected in accordance with various example embodiments. Similarly, other mood categories may be selected in accordance with various example embodiments.

In operation 1040, the generation module 430 generates the grid 510 of the 2D user interface 500 as an arrangement of multiple zones (e.g., zones 501-509) that correspond to multiple sets of media files. For example, the multiple sets of media files may be playlists (e.g., playlist 610). As noted above, each zone (e.g., zone 501) in the grid 510 may correspond, directly or indirectly (e.g., by virtue of the zone's corresponding mood category), to a playlist that identifies a subset of the group of media files (e.g., the library or collection of media files) from which the media file was accessed in operation 710. The playlist may be dynamically generated (e.g., based on the zone's mood category), for example, each time a particular mood categories selected by the user over multiple sessions (e.g., over days, weeks, months, or years). Hence, the multiple zones that correspond to multiple playlists may identify multiple subsets of the group of media files. As discussed above, the multiple zones may include the zone (e.g., zone 501) whose position in the grid 510 corresponds to the mood category of the media file.

One or more of operations 1041, 1042, 1043, 1044, 1045, 1046, and 1047 may be performed as part (e.g., a precursor task, a subroutine, or a portion) of operation 1040. In operation 1041, the generation module 430 determines a uniform size of the multiple playlists (e.g., playlist 610) that correspond to the multiple zones (e.g., zones 501-509) of the grid 510. That is, the generation module 430 may determine a uniform number (e.g., within a predetermined tolerance) of media files that are to be listed in each of the multiple playlists. This feature may be helpful in situations where the group of media files is non-uniformly distributed among the multiple mood categories available for categorizing or characterizing media files. For example, the group may contain 100 media files that may be characterized as "Easy-going," but only 10 media files that may be characterized as "Peaceful." Accordingly, the generation module 430 may determine that a uniform size of the playlists is 35 media files, and these playlists may be generated (e.g., by the player module 460) based on the uniform size.

In operation 1042, the player module 460 generates one or more of the multiple playlists (e.g., playlist 610) that correspond to the multiple zones of the grid 510. The generation of these playlists may be based on the uniform size determined in operation 1041. In particular, the player module 460 may generate one or more of the multiple playlists to have a uniform number (e.g., within a predetermined tolerance) of media files listed therein. In some example embodiments, the player module 460 redistributes media files among the multiple playlists so that the multiple playlists are of the uniform size. That is, the player module 460 may re-categorize a media file into a different mood category (e.g., into a neighboring mood category corresponding to an adjacent zone in the grid 510). For example, where 100 media files may be characterized as "Easy-going," but the uniform size for the multiple playlists is 35 media files, 35 of the 100 media files may be listed in a playlist for "Easy-going" media files, while 65 of the 100 media files may be re-categorized into other playlists (e.g., a playlist for "Cool" media files, a playlist for "Fun" media files, a playlist for "Tender" media files, a playlist for "Romantic" media files, and a playlist for "Confident" media files).

In operation 1043, the generation module 430 generates the grid 510 of the 2D user interface 500 based on weather data. The weather data may indicate the weather at a location (e.g., geographic location). For example, the weather data may be provided by a weather information service and described atmospheric conditions at the location of a media system (e.g., vehicle media system 220 or portable media system 180). In some example embodiments, when the weather data indicates pleasant (e.g., sunny and warm) weather, the grid 510 is generated with more prominent (e.g., larger or highlighted) zones (e.g., zone 505) for relatively high energy and high valence (e.g., high positivity) mood categories, and zones for relatively low energy and low valence (e.g., low positivity) mood categories may be shown with less prominence or omitted from the grid 510 altogether. In certain example embodiments, when the weather data indicates gloomy (e.g., cold and wet) weather, the grid 510 is generated with more prominent zones (e.g., zone 508) for relatively low energy and low valence mood categories, and zones for relatively high energy and high valence mood categories may be shown with less prominence or entirely omitted from the grid 510.

In operation 1044, the generation module 430 generates the grid 510 based on location data. The location data may indicate a geographic location of the media system (e.g., of the vehicle media system 220 or the portable media system 180). For example, the location data may be accessed from a global positioning system (GPS) component or device included within the media system or communicatively coupled (e.g., connected) thereto. In some example embodiments, when the location data indicates that the media system is in a metropolitan area (e.g., a busy city) the grid 510 is generated with more prominent zones (e.g., zone 507) for relatively high energy mood categories, and zones for relatively low energy mood categories may be shown with less prominence or omitted from the grid 510. In certain example embodiments, when the location data indicates that the media system is in a sparsely populated area (e.g., a deserted beach or stretch of highway), the grid 510 is generated with more prominent zones (e.g., zone 506) for relatively low energy mood categories, and zones for relatively high energy mood categories may be shown with less prominence or omitted from the grid 510.

According to some example embodiments, location data includes or constitutes speed data (e.g., as a rate of change in locations), acceleration data (e.g., as a rate of change in speed) or both. Hence, in performing operation 1044, the generation module 430 may generate the grid 510 based on speed (e.g., velocity) data, acceleration data, or both. In some example embodiments, speed data may be accessed from a speedometer or accelerometer included within the media system (e.g., vehicle media system 220 or portable media system 180) or communicatively coupled thereto. Acceleration data may be accessed from such an accelerometer. Moreover, the speed data, the acceleration data, or both, may include vector components that are longitudinal to the direction of travel, transfers to the direction of travel, or any suitable combination thereof. Thus, certain example embodiments of the location data may include information that indicates the media system is traveling at excessively high speed, traveling at excessively low speed, or traveling erratically (e.g., weaving side to side). The location data therefore may be used in generating the drowsiness data in operation 1022. In some example embodiments, when the speed data indicates that the media system is moving at high speed (e.g., above 40 miles per hour), the grid 510 may be generated with more prominent zones (e.g., zone 505) for relatively high valence mood categories, and zones for relatively low valence mood categories may be shown with less prominence or omitted from the grid 510. In certain example embodiments, when the speed data indicates that the media system is moving at low speed (e.g., below 25 miles per hour), the grid 510 may be generated with more prominent zones (e.g., zone 509) for relatively low valence mood categories, and zones for relatively high valence mood categories may be shown less prominence or omitted from the grid 510. As noted above, certain example embodiments may generate and utilize drowsiness data, alertness data, emotion data, or any suitable combination thereof, in the manner described with respect to drowsiness data.

In operation 1045, the generation module 430 generates the grid 510 based on time data (e.g., accessed from a clock communicatively coupled to the generation module 430). The time data may indicate a time of day (e.g., at the location of the media system). For example, the time data may indicate that it is currently nighttime at the location of the media system. In some example embodiments, when the time data indicates that it is nighttime (e.g., between 9 PM and 6 AM local time), the grid 510 may be generated with more prominent zones (e.g., zone 502) for relatively low energy mood categories, and zones for relatively high energy mood categories may be shown with less prominence or omitted from the grid 510. In certain example embodiments, when the time data indicates that it is morning (e.g., between 6 AM and 9 AM local time), the grid 510 may be generated with more prominent zones (e.g., zone 504) for relatively high energy mood categories, and zones for relatively low energy mood categories may be shown with less prominence or omitted from the grid 510.

In operation 1046, the generation module 430 generates the grid 510 based on a user preference (e.g., of the user 162 or the user 182). This user preference may be explicit or implicit. The user preference may be stored in the database 150. In some example embodiments, the user preference is stored within the media system itself (e.g., vehicle media system 220 or portable media system 180). The user preference may indicate one or more favorite mood categories for emphasis or inclusion in the grid 510. The user preference may indicate one or more undesired mood categories for reduced prominence or exclusion from the grid 510.

In operation 1047, the generation module 430 generates the grid 510 based on the drowsiness data generated in operation 1022. As noted above, the drowsiness data may indicate a level of drowsiness of a person (e.g., a driver of a vehicle). For example, the drowsiness data may indicate a level of sleepiness in the user 162 within the vehicle 160. In some example embodiments, when the drowsiness data indicates a high level of drowsiness (e.g., above a predetermined threshold for sleepiness), the grid 510 may be generated with more prominent zones (e.g., zone 507) for relatively high energy mood categories, and zones for relatively low energy mood categories may be shown with less prominence or omitted from the grid 510. In certain example embodiments, when the drowsiness data indicates a low level of drowsiness (e.g., below a predetermined threshold for sleepiness), the grid 510 may be generated with more prominent zones (e.g., zone 501) for relatively low energy mood categories, and zones for relatively high energy mood categories may be shown with less prominence or omitted from the grid 510. In various example embodiments, there is no effect on the grid 510 when the drowsiness data indicates a low level of drowsiness. As noted above, certain example embodiments may generate and utilize drowsiness data, alertness data, emotion data, or any suitable combination thereof, in the manner described herein with respect to drowsiness data.

In operation 1050, the player module 460 initiates playback of a playlist (e.g., among multiple playlists corresponding to the multiple zones of the grid 510) based on (e.g., in response to) the drowsiness data generated in operation 1022. Likewise, certain example embodiments may utilize drowsiness data, alertness data, emotion data, or any suitable combination thereof, in the manner described with respect to drowsiness data. As noted above, the playlist corresponds to a mood category, which may correspond to an energy level and a valence (e.g., positivity) level. The playlist may reference the media file accessed in operation 710 and may correspond to the mood category determined in operation 720. In some example embodiments, the player module 460 selects the playlist based on the drowsiness data and initiates playback of the selected playlist, in whole or in part. The playlist selected and played may be a playlist that corresponds to a mood category with a relatively high energy level, a relatively high valence (e.g., positivity) level, or both (e.g., a playlist for "Lively" media files, a playlist for "Rowdy" media files, or a playlist for "Excited" media files). According to various example embodiments, the player module 460 may perform operation 1050 automatically (e.g., immediately upon detection of the level of drowsiness, alertness, or emotion transgressing a predetermined threshold or within a predetermined period of time thereafter). This behavior may be configurable by a user (e.g., user 162 or user 182) via a preference setting or a hardware switch (e.g., implemented in the controller 240).

Figure 11:
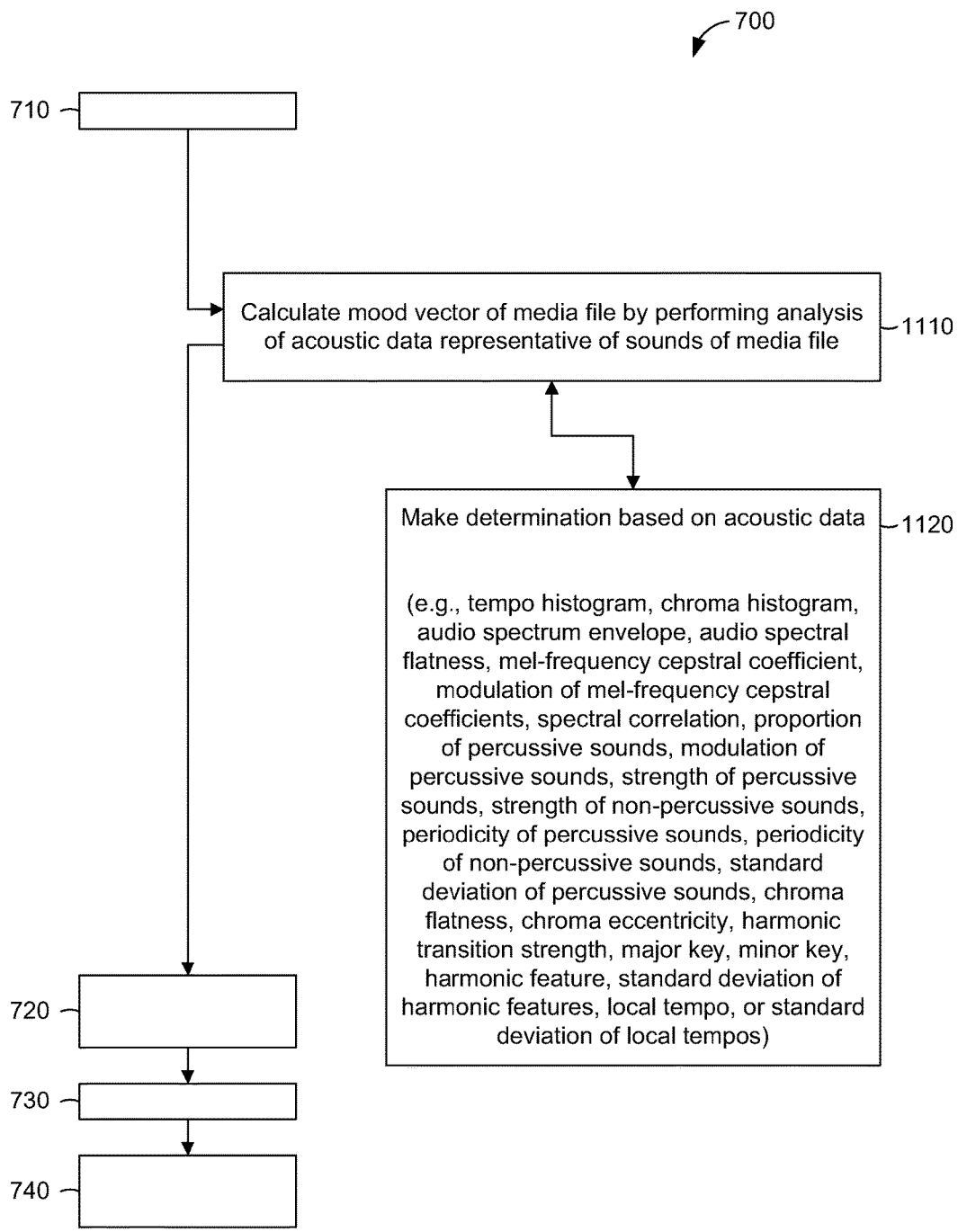

As shown in FIG. 11, the method 700 may include operation 1110. In operation 1110, the vector module 450 calculates the mood vector of the media file accessed in operation 710. The mood vector may be calculated by performing an analysis of acoustic data contained in the media file. As noted above, the acoustic data may be representative of sounds encoded in the media file. Since the mood vector of the media file may have multiple components, operation 1110 may include determining the multiple components of the mood vector based on the analysis of the acoustic data. Hence, the vector module 450 may determine a predominant component of the mood vector.

According to various example embodiments, operation 1120 may be performed as part (e.g., a precursor task, a subroutine, or a portion) of operation 1110. In operation 1120, the vector module 450, in performing the analysis of the acoustic data, makes a determination based on the acoustic data. The making of this determination may include generating or calculating one or more data structures or values. Examples of these data structures or values include a tempo histogram, a chroma histogram, an audio spectrum envelope, an audio spectral flatness, a mel-frequency cepstral coefficient, a modulation of mel-frequency cepstral coefficients, a spectral correlation, a proportion of percussive sounds, a modulation of percussive sounds, a strength of percussive sounds, a strength of non-percussive sounds, a periodicity of percussive sounds, a periodicity of non-percussive sounds, a standard deviation of percussive sounds, a chroma flatness, a chroma eccentricity, a harmonic transition strength, a major key, a minor key, a harmonic feature, a standard deviation of harmonic features, a local tempo, and a standard deviation of local tempos. As noted above, the determination of these data structures or values may be based on the acoustic data of the media file.

According to various example embodiments, one or more of the methodologies described herein may facilitate generation and presentation of the 2D user interface 500. Moreover, one or more of the methodologies described herein may facilitate initiation of one or more actions with respect to a mood category, its corresponding playlist, or its corresponding subset of media files. Hence, one or more the methodologies described herein may facilitate provision in operation of a convenient and efficient user experience in identifying, accessing, playing, or managing media files.

When these effects are considered in aggregate, one or more of the methodologies described herein may obviate a need for certain efforts or resources that otherwise would be involved in identifying, categorizing, accessing, playing, or managing media files. Efforts expended by a user in such activities may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Figure 12:
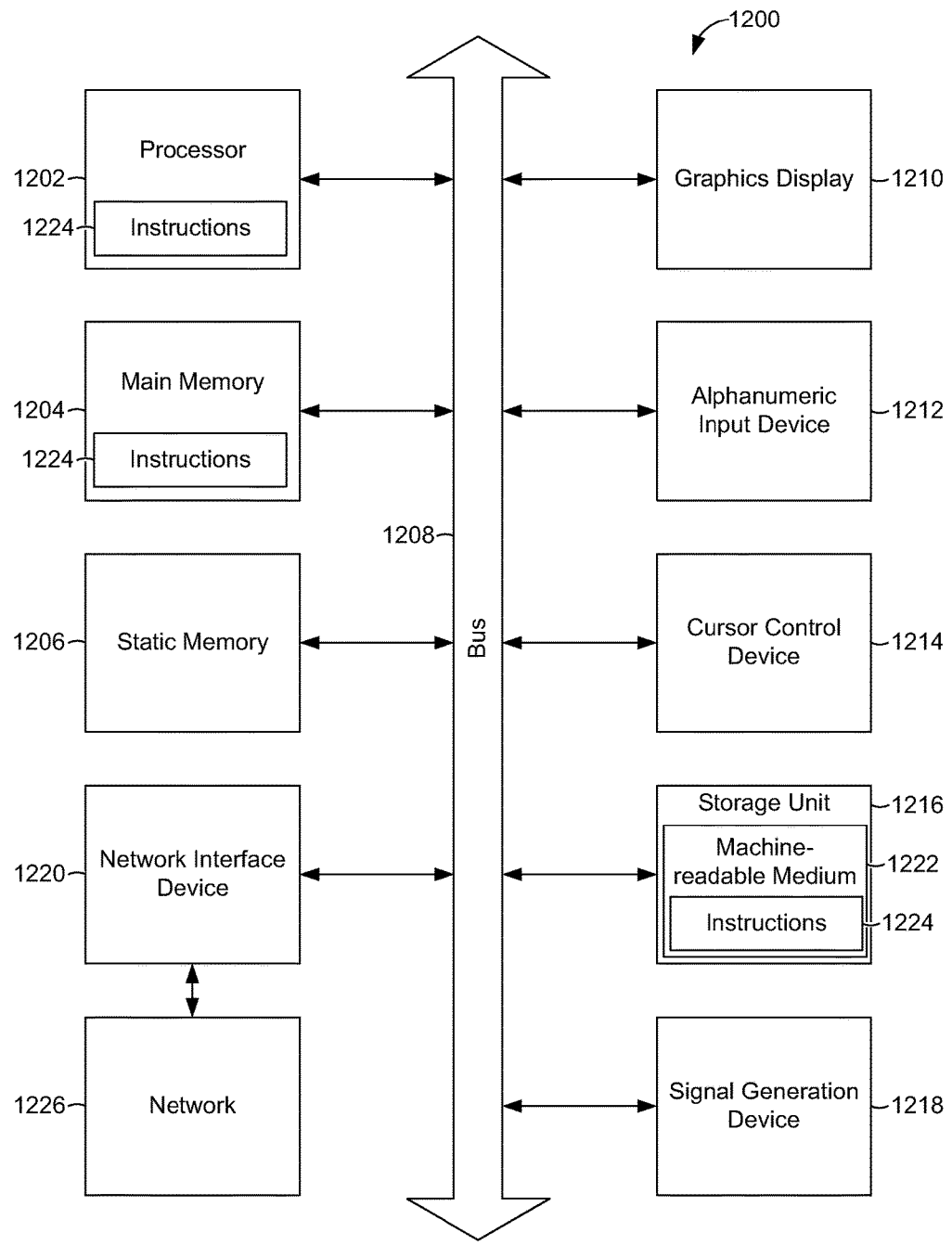
FIG. 12 is a block diagram illustrating components of a machine, according to some example embodiments, able to read instructions from a machine-readable medium and perform any one or more of the methodologies discussed herein.

FIG. 12 is a block diagram illustrating components of a machine 1200, according to some example embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system and within which instructions 1224 (e.g., software) for causing the machine 1200 to perform any one or more of the methodologies discussed herein may be executed. In alternative embodiments, the machine 1200 operates as a standalone device or may be connected (e.g., networked) to other machines. In a networked deployment, the machine 1200 may operate in the capacity of a server machine or a client machine in a server-client network environment, or as a peer machine in a peer-to-peer (or distributed) network environment. The machine 1200 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1224, sequentially or otherwise, that specify actions to be taken by that machine. Further, while only a single machine is illustrated, the term "machine" shall also be taken to include a collection of machines that individually or jointly execute the instructions 1224 to perform any one or more of the methodologies discussed herein.

The machine 1200 includes a processor 1202 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1204, and a static memory 1206, which are configured to communicate with each other via a bus 1208. The machine 1200 may further include a graphics display 1210 (e.g., a plasma display panel (PDP), a light emitting diode (LED) display, a liquid crystal display (LCD), a projector, or a cathode ray tube (CRT)). The machine 1200 may also include an alphanumeric input device 1212 (e.g., a keyboard), a cursor control device 1214 (e.g., a mouse, a touchpad, a trackball, a joystick, a motion sensor, or other pointing instrument), a storage unit 1216, a signal generation device 1218 (e.g., a speaker), and a network interface device 1220.

The storage unit 1216 includes a machine-readable medium 1222 on which is stored the instructions 1224 (e.g., software) embodying any one or more of the methodologies or functions described herein. The instructions 1224 may also reside, completely or at least partially, within the main memory 1204, within the processor 1202 (e.g., within the processor's cache memory), or both, during execution thereof by the machine 1200. Accordingly, the main memory 1204 and the processor 1202 may be considered as machine-readable media. The instructions 1224 may be transmitted or received over a network 1226 (e.g., network 190) via the network interface device 1220.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1222 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine (e.g., machine 1200), such that the instructions, when executed by one or more processors of the machine (e.g., processor 1202), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated descriptions define various example embodiments of methods, systems (e.g., apparatus), and computer-readable media discussed herein:

1. A method comprising:
   accessing a media file from a plurality of media files, the media file storing acoustic data representative of sounds;
   determining a mood category of the media file based on a predominant component of a mood vector calculated from the acoustic data representative of the sounds of the media file,
      the predominant component of the mood vector being one of multiple components of the mood vector,
      the determined mood category characterizing the media file as evocative of a mood described by the mood category;
   generating a two-dimensional user interface to the plurality of media files,
      the two-dimensional user interface depicting a grid that includes a zone whose position in the grid corresponds to the mood category determined based on the predominant component of the mood vector calculated from the media file, the generating of the two-dimensional user interface being performed by a processor of a machine; and presenting the two-dimensional user interface that depicts the grid with the zone whose position corresponds to the mood category.

2. The method of description 1, wherein:

the determining of the mood category of the media file includes:

summing weights of the multiple components of the mood vector; and accessing a database that correlates the mood category with a largest weight among the summed weights.

3. The method of description 1 or description 2, wherein:

the determining of the mood category of the media file includes accessing a database that correlates the mood category with the predominant component of the mood vector.

4. The method of description 3, wherein:

the database that correlates the mood category with the predominant component of the mood vector is a first localized database among multiple localized databases that reference the predominant component of the mood vector.

5. The method of any of descriptions 1 to 4, wherein:

the determining of the mood category of the media file includes accessing a predetermined human-generated lookup table that maps the multiple components of the mood vector to a plurality of mood categories that includes the mood category.

6. The method of any of descriptions 1 to 5, wherein:

the determining of the mood category of the media file includes accessing a lookup table that correlates the mood category with the position of the zone in the grid.

7. The method of any of descriptions 1 to 6, wherein:

the presenting of the two-dimensional user interface includes displaying the two-dimensional user interface on a display, the zone whose position in the grid corresponds to the mood category overlapping an interactive portion of a controller that is operable to initiate an action with respect to the mood category.

8. The method of description 7, wherein:

the interactive portion of the controller is operable to initiate the action selected from a group consisting of:

generation of a playlist for the mood category, modification of the playlist for the mood category, modification of a parameter that defines the playlist for the mood category, generation of a recommendation from the mood category, modification of a preference that influences recommendations from the mood category, and identification of a user related to the mood category.

9. The method of description 7 or description 8, wherein:

the interactive portion of the controller is operable to initiate the action with respect to a further mood category that corresponds to a further zone adjacent to the zone in the grid.

10. The method of any of descriptions 7 to 9, wherein:

the controller is configured to receive at least one of a touch input, a gesture input, or a voice input.

11. The method of any of descriptions 7 to 10, wherein:

the controller is configured to receive a sequence of inputs that specifies multiple zones in the grid as a selection of multiple mood categories in sequential order.

12. The method of description 1 further comprising:

generating a playlist based on the mood category, the playlist identifying a subset of the plurality of media files that includes the media file and characterizing the subset as evocative of the mood described by the mood category, the playlist corresponding to the zone whose position in the grid corresponds to the mood category; and presenting the playlist in response to a user-generated selection of the position of the zone within the two-dimensional user interface.

13. The method of any of descriptions 1 to 12 further comprising:

receiving a user-generated selection of the zone whose position corresponds to the mood category; and initiating playback of a playlist that references the media file and that corresponds to the mood category, the initiating of the playback of the playlist being in response to the user-generated selection of the zone.

14. The method of any of descriptions 1 to 13 further comprising:

receiving a user-generated selection of the zone whose position corresponds to the mood category; and initiating playback of a representative audio file that is evocative of the mood described by the mood category, the initiating of the playback of the representative audio file being in response to the user-generated selection of the zone.

15. The method of any of descriptions 1 to 14, wherein:

the generating of the two-dimensional user interface includes coloring the zone based on a count of media files characterized by the mood category.

16. The method of description 15, wherein:

the coloring of the zone is based on the count representing a number of new media files characterized by the mood category within a period of time.

17. The method of any of descriptions 1 to 16, wherein:

the generating of the two-dimensional user interface includes indicating that the zone corresponds to a preferred mood category of a user.

18. The method of any of descriptions 1 to 17, wherein:

the mood category is identified by a mood descriptor that describes the mood of which the media file is characterized as being evocative; and the generating of the two-dimensional user interface is based on a set of mood descriptors inclusive of the mood descriptor and localized to a geographic region.

19. The method of any of descriptions 1 to 18, wherein:

the mood category corresponds to an energy level within a range of energy levels descriptive of musical calmness; and the grid includes an axis that represents the range of energy levels.

20. The method of description 19, wherein:

the range of energy levels includes a low energy level that indicates high musical calmness and includes a high energy level that indicates low musical calmness.

21. The method of description 19 or description 20 further comprising:

receiving a user-generated selection of the axis for display of the range of energy levels; and wherein the generating of the two-dimensional user interface generates the two-dimensional user interface with the axis in response to the user-generated selection of the axis for display.

22. The method of any of descriptions 1 to 21, wherein:
the mood category corresponds to a valence level within a range of valence levels, the valence level being descriptive of musical darkness; and
the grid includes an axis that represents the range of positivity levels.

23. The method of description 22, wherein:
the range of valence levels includes a low positivity level that indicates a high musical darkness and that includes a high positivity level that indicates a low musical darkness.

24. The method of description 22 or description 23 further comprising:
receiving a user-generated selection of the axis for display of the range of valence levels; and wherein
the generating of the two-dimensional user interface generates the two-dimensional user interface with the axis in response to the user-generated selection of the axis for display.

25. The method of any of descriptions 1 to 24, wherein:
the generating of the two-dimensional user interface that depicts the grid includes generating the grid as an arrangement of multiple zones that include the zone whose position in the grid corresponds to the mood category; and
the multiple zones of the grid correspond to multiple playlists that identify multiple subsets of the plurality of media files.

26. The method of description 25, wherein:
the generating of the grid with the multiple zones includes determining a uniform size of the multiple playlists that correspond to the multiple zones; and
generating the multiple playlists based on the uniform size.

27. The method of description 25 or description 26, wherein:
the generating of the grid with the multiple zones is based on weather data indicative of weather at a location.

28. The method of any of descriptions 25 to 27, wherein:
the generating of the grid with the multiple zones is based on speed data indicative of a speed of a vehicle.

29. The method of any of descriptions 25 to 28, wherein:
the generating of the grid with the multiple zones is based on location data indicative of a location.

30. The method of any of descriptions 25 to 29, wherein:
the generating of the grid with the multiple zones is based on time data indicative of a time of day at a location.

31. The method of any of descriptions 25 to 30, wherein:
the generating of the grid with the multiple zones is based on a preference of a user.

32. The method of any of descriptions 25 to 31, wherein:
the generating of the grid with multiple zones is based on drowsiness data indicative of a level of drowsiness of a driver of a vehicle.

33. The method of description 32 further comprising:
initiating playback of a playlist among the multiple playlists,
the playlist referencing the media file and corresponding to the mood category that characterizes the media file as evocative of the mood described by the mood category,
the initiating of the playback of the playlist being based on the drowsiness data that indicates the level of drowsiness of the driver of the vehicle.

34. The method of description 32 or description 33 further comprising:
generating the drowsiness data from an image that depicts an eye of the driver of the vehicle.

35. The method of description 34 further comprising:
capturing the image that depicts the eye of the driver from a camera in the vehicle that is pointed at the eye of the driver of the vehicle.

36. The method of any of descriptions 1 to 35 further comprising:
calculating the mood vector of the media file by performing an analysis of the acoustic data representative of the sounds of the media file; and
determining the predominant component of the mood vector based on the analysis of the acoustic data.

37. The method of description 36, wherein:
the analysis of the acoustic data that represents the sounds of the media file includes a determination of at least one of a tempo histogram, a chroma histogram, an audio spectrum envelope, an audio spectral flatness, a mel-frequency cepstral coefficient, a modulation of mel-frequency cepstral coefficients, a spectral correlation, a proportion of percussive sounds, a modulation of percussive sounds, a strength of percussive sounds, a strength of non-percussive sounds, a periodicity of percussive sounds, a periodicity of non-percussive sounds, a standard deviation of percussive sounds, a chroma flatness, a chroma eccentricity, a harmonic transition strength, a major key, a minor key, a harmonic feature, a standard deviation of harmonic features, a local tempo, or a standard deviation of local tempos,
the determination being based on the acoustic data that represents the sounds of the media file.

38. A non-transitory machine-readable storage medium comprising instructions that, when executed by one or more processors of a machine, cause the machine to perform operations comprising:
accessing a media file from a plurality of media files,
the media file storing acoustic data representative of sounds;
determining a mood category of the media file based on a predominant component of a mood vector calculated from the acoustic data representative of the sounds of the media file,
the predominant component of the mood vector being one of multiple components of the mood vector,
the determined mood category characterizing the media file as evocative of a mood described by the mood category;
generating a two-dimensional user interface to the plurality of media files,
the two-dimensional user interface depicting a grid that includes a zone whose position in the grid corresponds to the mood category determined based on the predominant component of the mood vector calculated from the media file,
the generating of the two-dimensional user interface being performed by the one or more processors of the machine; and
presenting the two-dimensional user interface that depicts the grid with the zone whose position corresponds to the mood category.

39. The non-transitory machine-readable storage medium of description 38, wherein the operations further comprise:
generating a playlist based on the mood category,
the playlist identifying a subset of the plurality of media files that includes the media file and characterizing the subset as evocative of the mood described by the mood category,
the playlist corresponding to the zone whose position in the grid corresponds to the mood category; and
presenting the playlist in response to a user-generated selection of the position of the zone within the two-dimensional user interface.

40. A system comprising:
an access module configured to access a media file from a plurality of media files, the media file storing acoustic data representative of sounds;
the category module configured to determine a mood category of the media file based on a predominant component of a mood vector calculated from the acoustic data representative of the sounds of the media file, the predominant component of the mood vector being one of multiple components of the mood vector,
the determined mood category characterizing the media file as evocative of a mood described by the mood category;
a processor configured by a generation module to generate a two-dimensional user interface to the plurality of media files,
the two-dimensional user interface depicting a grid that includes a zone whose position in the grid corresponds to the mood category determined based on the predominant component of the mood vector calculated from the media file; and
a presentation module configured to present the two-dimensional user interface that depicts the grid with the zone whose position corresponds to the mood category.

41. The system of description 40 further comprising:
a player module configured to generate a playlist based on the mood category,
the playlist identifying a subset of the plurality of media files that includes the media file and characterizing the subset as evocative of the mood described by the mood category, and
the playlist corresponding to the zone whose position in the grid corresponds to the mood category; and wherein
the presentation module is configured to present the playlist in response to a user-generated selection of the position of the zone within the two-dimensional user interface.

What is claimed is:

1. A method comprising:
accessing a media file that stores acoustic data;
determining a mood of the media file based on an analysis of the acoustic data of the media file, the media file being characterized as indicative of the determined mood, the determining of the mood causing incrementation of a count of media files characterized as indicative of the determined mood within a predetermined period of time;
generating a user interface that includes zones among which is a zone whose position in the user interface corresponds to the determined mood, the generating of the user interface including coloring the zone based on the incremented count of media files characterized as indicative of the determined mood within the predetermined period of time, the generating of the user interface being performed by a processor of a machine; and
presenting the user interface that includes the zone whose position corresponds to the mood of the media file, the zone being colored based on the incremented count of media files characterized as indicative of the determined mood within the predetermined time.

2. The method of claim 1, wherein:
the predetermined period of time includes a user-configured period of time.

3. The method of claim 1, wherein:
the generating of the user interface includes coloring the zone differently from at least one other zone in the user interface based on the count of media files characterized as indicative of the determined mood within the predetermined period of time.

4. The method of claim 1, wherein:
the generating of the user interface includes highlighting the zone with the coloring that is determined based on the count of media files characterized as indicative of the determined mood within the predetermined period of time.

5. The method of claim 1, wherein:
the generating of the user interface includes coloring the zone by outlining the zone differently from at least one other zone in the user interface, the outlining being based on the count of media files characterized as indicative of the determined mood within the predetermined period of time.

6. The method of claim 1, wherein:
the generating of the user interface includes coloring the zone by determining a brightness of the zone differently from at least one other zone in the user interface, the determining of the brightness being based on the count of media files characterized as indicative of the determined mood within the predetermined period of time.

7. The method of claim 1, wherein:
the generating of the user interface includes coloring the zone by causing the zone to flash differently from at least one other zone in the user interface, the causing of the zone to flash being based on the count of media files characterized as indicative of the determined mood within the predetermined period of time.

8. The method of claim 1, wherein:
the presenting of the user interface is on an interactive controller configured to receive a sequence of inputs that specifies a sequential order of multiple zones selected from the user interface.

9. The method of claim 8, wherein:
the sequential order defines a path through a contiguous set of zones in the user interface and selects the contiguous set of zones in order.

10. The method of claim 8, wherein:
the sequential order defines a path through a non-contiguous set of zones in the user interface and selects the non-contiguous set of zones in order.

11. The method of claim 8, wherein:
the interactive controller is configured to receive the sequence of inputs via at least one of a touch input, a gesture input, or voice input.

12. The method of claim 8, wherein:
the interactive controller is operable to initiate an action applicable to the zones selected from the user interface according to the sequential order specified by the received sequence of inputs.

13. The method of claim 1, wherein:
the generating of the user interface includes determining a single size for multiple playlists that each correspond to a different zone in the user interface.

14. The method of claim 13 further comprising:
generating a different playlist for each zone in the user interface, each of the different playlists having the same determined single size.

15. The method of claim 14, wherein:
the generating of the different playlists includes recategorizing the media file based on the determined single size for the multiple playlists.

16. The method of claim 15, wherein:
the recategorizing of the media file associates the media file with a different zone in the user interface than the zone whose position corresponds to the determined mood of the media file.

17. The method of claim 1, wherein:
the generating of the user interface includes determining a color of the zone based on the count of media files characterized as indicative of the determined mood within the predetermined period of time.

18. A non-transitory machine-readable storage medium comprising instructions that, when executed by one or more processors of a machine, cause the machine to perform operations comprising:
accessing a media file that stores acoustic data;
determining a mood of the media file based on an analysis of the acoustic data of the media file, the media file being characterized as indicative of the determined mood, the determining of the mood causing incrementation of a count of media files characterized as indicative of the determined mood within a predetermined period of time;
generating a user interface that includes zones among which is a zone whose position in the user interface corresponds to the determined mood, the generating of the user interface including coloring the zone based on the incremented count of media files characterized as indicative of the determined mood within the predetermined period of time; and
presenting the user interface that includes the zone whose position corresponds to the mood of the media file, the zone being colored based on the incremented count of media files characterized as indicative of the determined mood within the predetermined time.

19. The non-transitory machine-readable storage medium of claim 18, wherein:
the presenting of the user interface is on an interactive controller configured to receive a sequence of inputs that specifies a sequential order of multiple zones selected from the user interface.

20. A system comprising:
an access module configured to access a media file that stores acoustic data;
a mood module configured to determine a mood of the media file based on an analysis of the acoustic data of the media file, the media file being characterized as indicative of the determined mood, determination of the mood causing incrementation of a count of media files characterized as indicative of the determined mood within a predetermined period of time;
a processor configured by a generation module to generate a user interface that includes zones among which is a zone whose position in the user interface corresponds to the determined mood, generation of the user interface including coloring the zone based on the incremented count of media files characterized as indicative of the determined mood within the predetermined period of time; and
a presentation module configured to present the user interface that includes the zone whose position corresponds to the mood of the media file the zone being colored based on the incremented count of media files characterized as indicative of the determined mood within the predetermined time.

21. The system of claim 20, wherein:
the generation module configures the processor to determine a single size for multiple playlists that each correspond to a different zone in the user interface.

22. The system of claim 20, wherein:
the coloring of the zone is determined based on the count of media files and includes outlining that is different from at least one other zone in the user interface.

23. The system of claim 20, wherein:
the coloring of the zone is determined based on the count of media files and includes brightness that is different from at least one other zone in the user interface.

24. The system of claim 20, wherein:
the coloring of the zone is determined based on the count of media files and includes time-variant coloring that is different from at least one other zone in the user interface.

25. The system of claim 24, wherein:
the time-variant coloring of the zone includes flashing that is different from at least one other zone in the user interface.

26. The system of claim 24, wherein:
the time-variant coloring of the zone includes animation that is different from at least one other zone in the user interface.

* * * * *

UNITED STATES PATENT AND TRADEMARK OFFICE
CERTIFICATE OF CORRECTION

PATENT NO. : 9,891,796 B2
APPLICATION NO. : 14/462402
DATED : February 13, 2018
INVENTOR(S) : DiMaria et al.

Page 1 of 1

It is certified that error appears in the above-identified patent and that said Letters Patent is hereby corrected as shown below:

In the Claims

Column 40, Line 20 Claim 20:
Replace "file" with --file,--.

Signed and Sealed this
Twenty-eighth Day of August, 2018

Andrei Iancu
*Director of the United States Patent and Trademark Office*